United States Patent [19]

Tateno et al.

[11] Patent Number: 4,785,917

[45] Date of Patent: Nov. 22, 1988

[54] CONTROL MECHANISM FOR AUTOMATIC TRANSMISSIONS

[75] Inventors: Toshiaki Tateno; Shigeki Fukushima, both Yokohama; Tomoytuki Iwamoto, Kawasaki; Nobuo Kijima, Inagi, all of Japan

[73] Assignee: Mitsubishi Jidosha Kogyo Kabushiki Kaisha, Tokyo, Japan

[21] Appl. No.: 925,095

[22] PCT Filed: Feb. 14, 1986

[86] PCT No.: PCT/JP86/00064

§ 371 Date: Oct. 7, 1986

§ 102(e) Date: Oct. 7, 1986

[87] PCT Pub. No.: WO86/04865

PCT Pub. Date: Aug. 28, 1986

[30] Foreign Application Priority Data

Feb. 16, 1985 [JP] Japan .................. 60-28747
May 21, 1985 [JP] Japan ................. 60-106922
Jun. 18, 1985 [JP] Japan .................. 60-91663
Jul. 8, 1985 [JP] Japan ................. 60-103833
Jul. 26, 1985 [JP] Japan ................. 60-165201

[51] Int. Cl.⁴ ............................ B60K 41/28
[52] U.S. Cl. .................. 192/0.08; 192/0.076; 192/0.084; 192/3.58; 74/872; 74/874
[58] Field of Search ........... 192/0.044, 0.052, 0.046, 192/0.076, 0.09, 0.092, 0.062, 3.58, 103 R, 0.073, 0.08, 0.084; 74/846, 866, 858, 872, 874; 364/424.1

[56] References Cited

U.S. PATENT DOCUMENTS

| | | | |
|---|---|---|---|
| 2,781,114 | 2/1957 | Slee et al. ................. | 192/3 R |
| 3,129,795 | 4/1964 | Goeschel et al. ............ | 192/0.062 |
| 3,645,366 | 2/1972 | Numatawa et al. ........... | 74/872 |
| 4,493,228 | 1/1985 | Vukovich et al. ............ | 364/424.1 |
| 4,523,667 | 6/1985 | Smyth ...................... | 192/0.084 |
| 4,569,255 | 2/1986 | Holmes et al. .............. | 364/424.1 |
| 4,632,231 | 12/1986 | Hattori et al. ............. | 192/0.076 |
| 4,638,690 | 1/1987 | Hattori et al. ............. | 74/866 |

FOREIGN PATENT DOCUMENTS

| | | | |
|---|---|---|---|
| 58-81257 | 5/1983 | Japan . | |
| 810895 | 3/1959 | United Kingdom . | |
| 2066919 | 7/1981 | United Kingdom | 192/0.084 |

Primary Examiner—Leslie A. Braun
Assistant Examiner—David A. Testardi
Attorney, Agent, or Firm—Hedman, Gibson, Costigan & Hoare

[57] ABSTRACT

An automatic transmission apparatus comprising a friction clutch (31) coupled to an output shaft of an engine (30), a clutch actuator (42) for operating the friction clutch, a parallel shaft type gear transmission (32), the input shaft of which is coupled to the friction clutch, a gear position changer (51) for changing the speed ratio of the transmission, and a rack actuator (38) for operating the control rack (35) of a fuel injection pump. A signal from a drive state-detector is used to determine a change in the speed ratio of the transmission (32). The rack actuator (38) gradually moves the control rack to an idling speed position, after which the clutch actuator disengages the friction clutch (31). The gear position changer (51) is operated in accordance with the disengagement of the friction clutch (31), so that the speed ratio of the transmission is changed accordingly. The control rack (35) is moved, so that the rotational speed of the output shaft (30) substantially coincides with the input shaft of the transmission (32), and the clutch actuator moves the friction clutch (31) in the engagement direction. When the difference in the rotational speed of the output shaft (30) and the input shaft of the transmission, has decreased below a predetermined value during the operation of the clutch actuator (42), the rack actuator (42) gradually moves to a position corresponding to the degree of depression of the accelerator pedal.

6 Claims, 21 Drawing Sheets

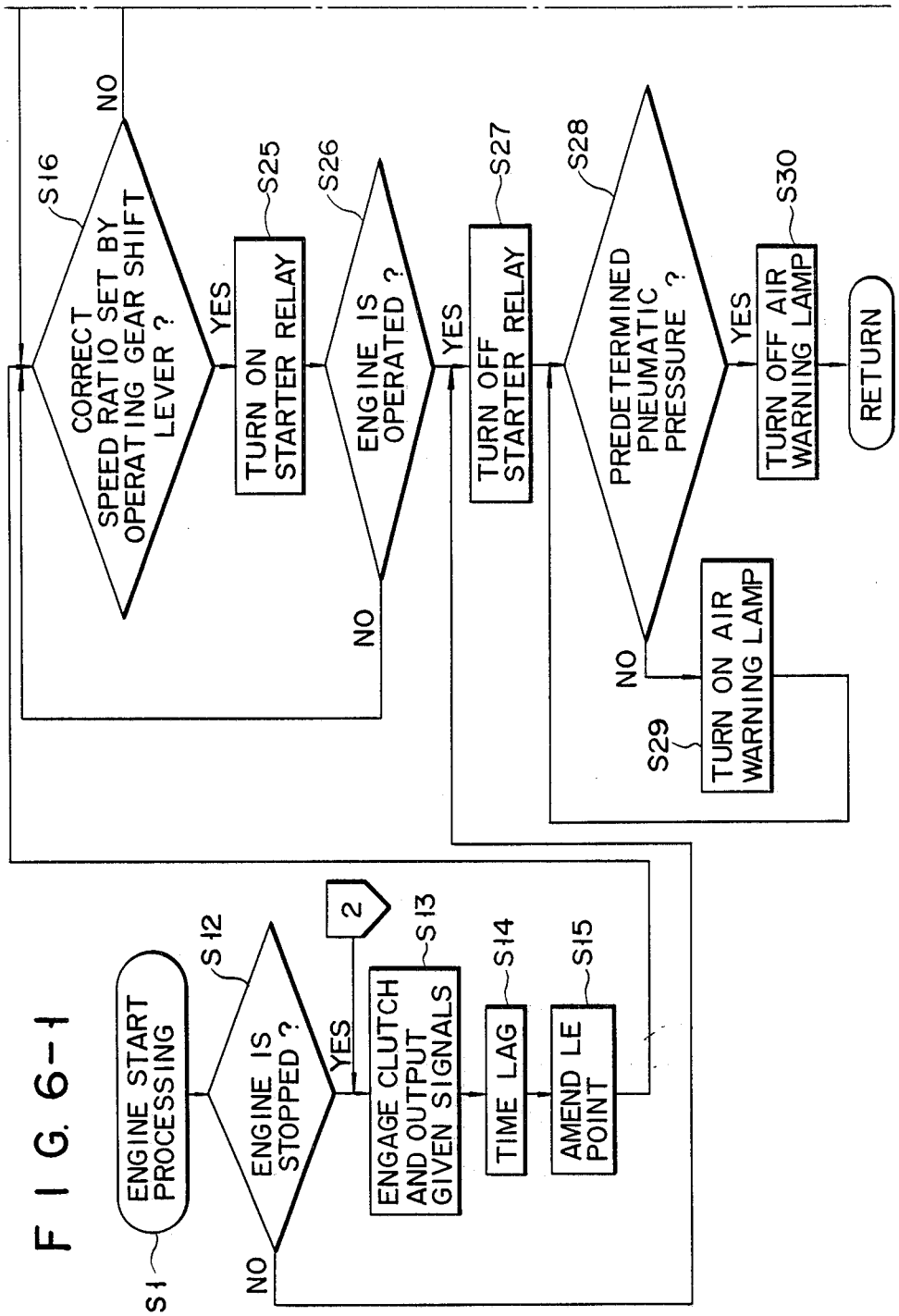

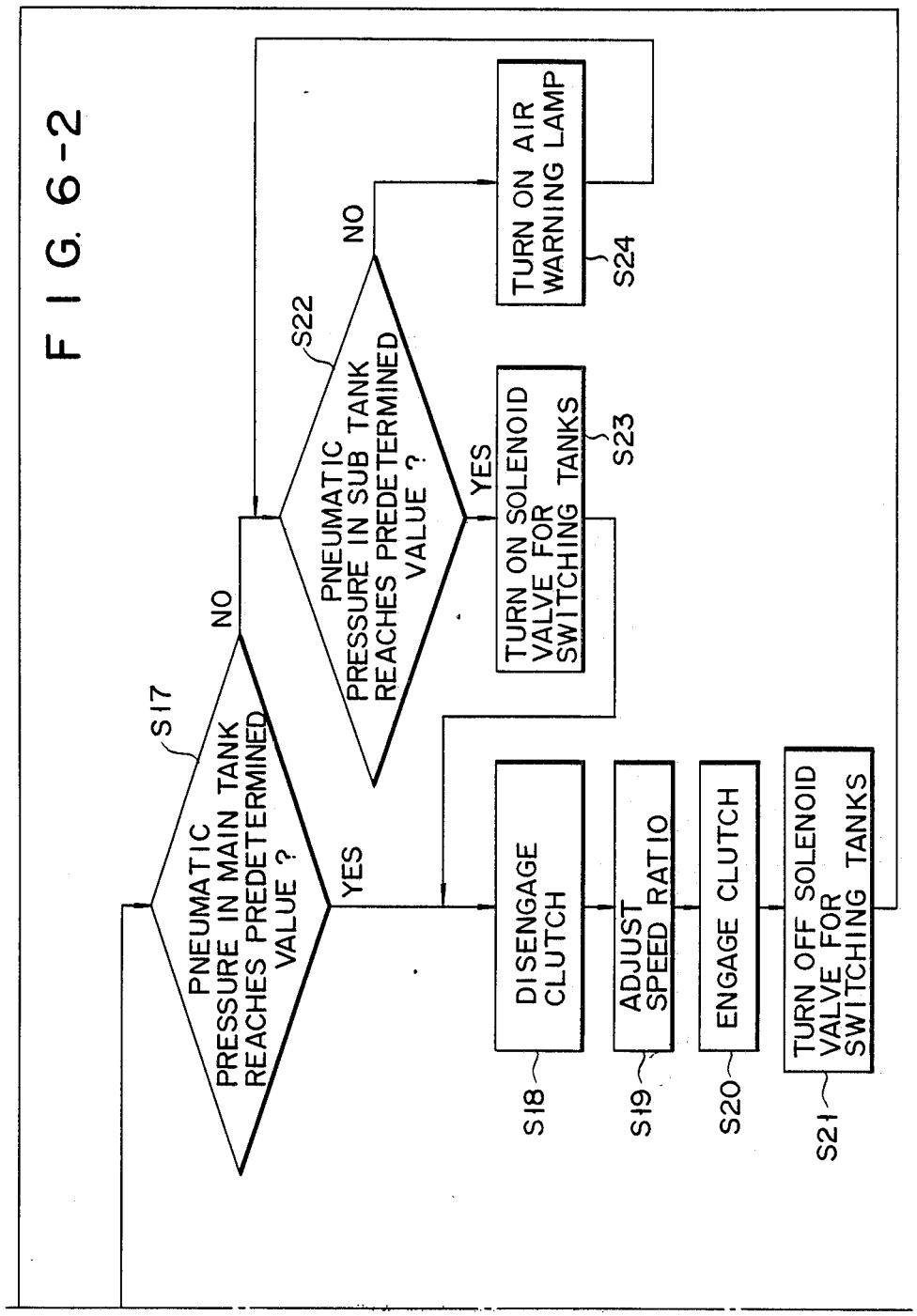

F I G. 13
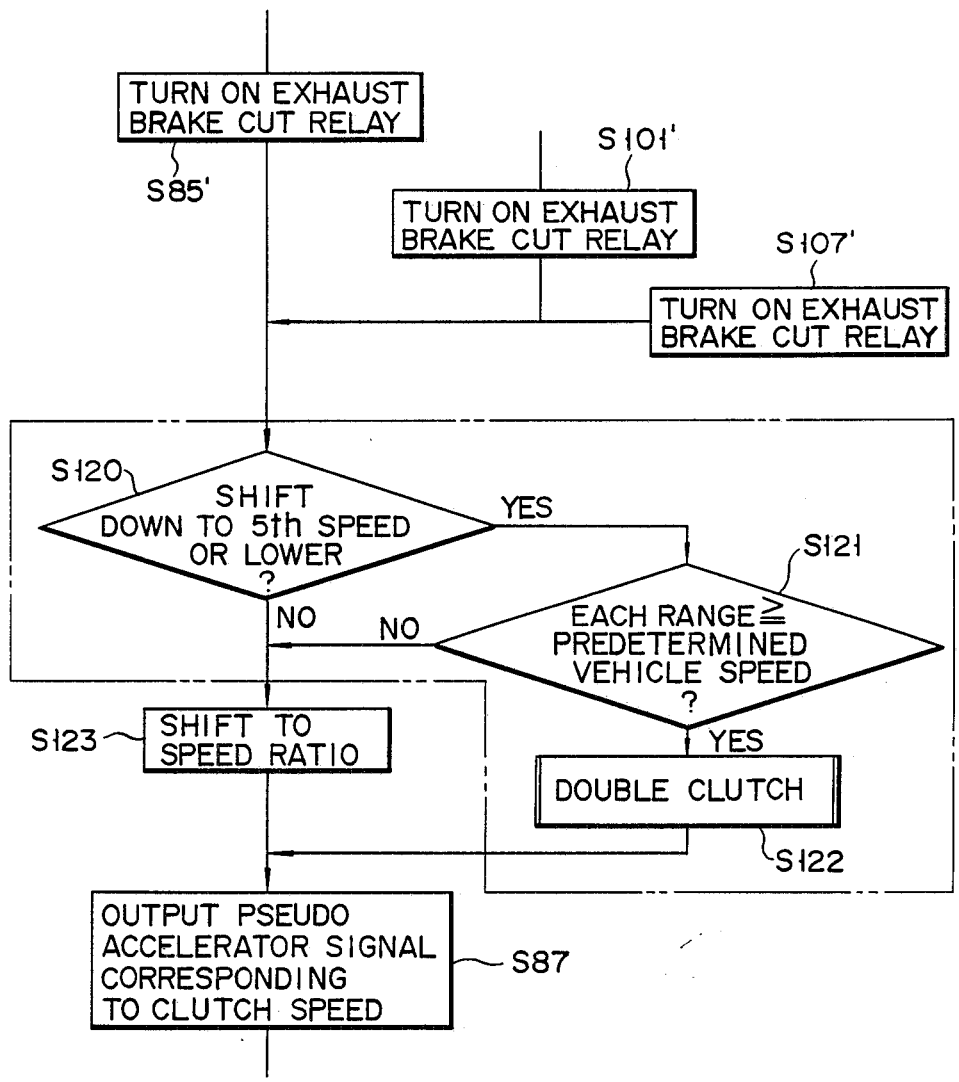

F I G. 15
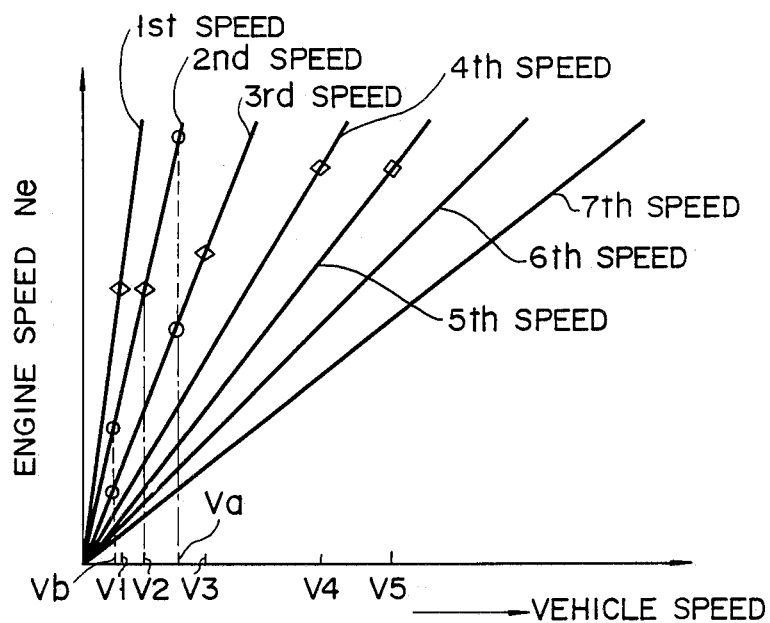
F I G. 16
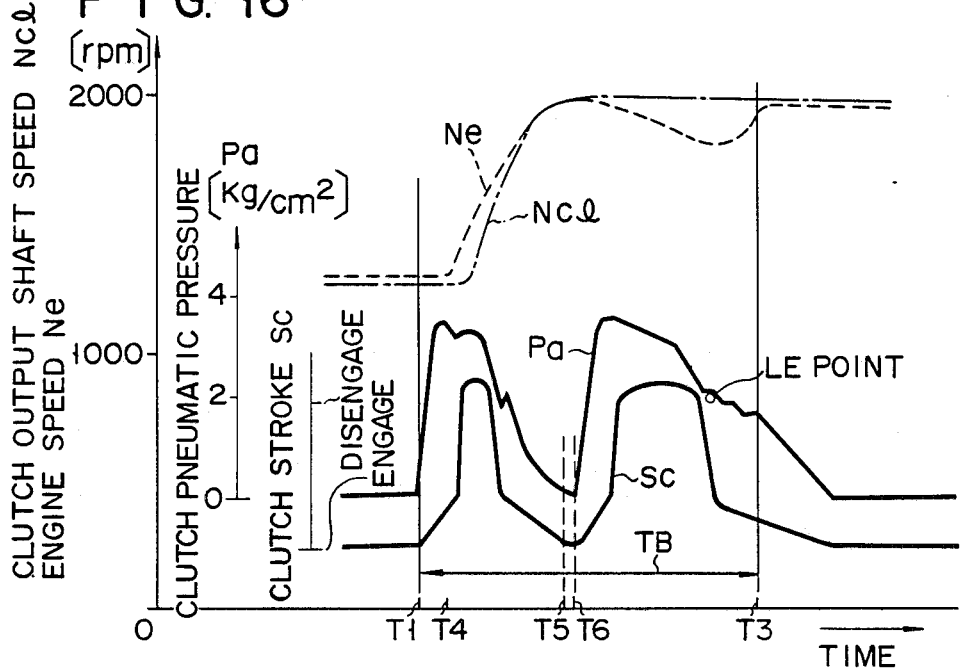

F I G. 17
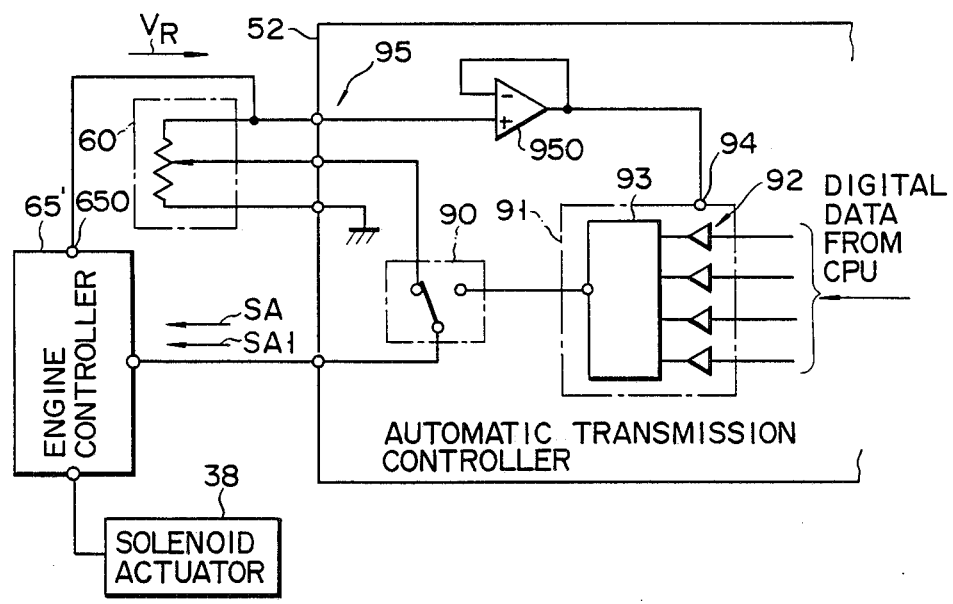

CONTROL MECHANISM FOR AUTOMATIC TRANSMISSIONS

FIELD OF THE INVENTION

The present invention relates to an automatic transmission apparatus for a vehicle, which electronically controls a friction clutch interposed between an engine and a transmission, via an actuator, and also electronically controls the meshing position of the transmission through a gear position switching means.

BACKGROUND OF THE INVENTION

In recent years, in order to reduce the workload of drivers of large trucks or buses, an automatic transmission apparatus which can automatically select a speed ratio corresponding to the driving conditions of a vehicle, has been proposed.

Conventional automatic transmission apparatuses have been developed for small vehicles, and normally comprise a gear position switch means for a planetary gear transmission, in which a fluid joint (e.g., a torque converter) is inserted between the engine and the planetary gear transmission, and compressed oil is used as the control medium.

In the development of automatic transmission apparatuses for large trucks, it is preferable to utilize a conventional drive system (e.g., a friction clutch, a transmission, and the like), as well as conventional product lines, since the number of such trucks manufactured is much smaller than that of small vehicles, and designing a new and expensive purpose-made torque converter increases cost.

SUMMARY OF THE INVENTION

The present invention has been developed in consideration of the above situation and has as its object to provide an automatic transmission apparatus which utilizes a conventional drive system and can smoothly perform automatic transmission operations under electronic control.

According to the present invention, an automatic transmission apparatus is provided for a vehicle, comprising: a friction clutch coupled to an output shaft of an engine; a clutch actuator for operating the friction clutch; a parallel shaft-type gear transmission, an input shaft of which is coupled to the friction clutch; gear position change-over means for changing speed ratio of the transmission; a rack actuator for operating the control rack of a fuel injection pump for supplying fuel to the engine; and a control apparatus having drive state-detection means for detecting the drive state of the vehicle; gear change-judging means for judging, in accordance with a signal from the drive state-detection means, when the speed ratio of the transmission is to be changed; fuel quantity decrease-control means for operating the rack actuator in accordance with the signal from the gear change-judging means, to gradually move the control rack to an idling speed position; clutch disengagement means for operating the clutch actuator upon operation of the fuel quantity decrease-control means, to disengage the friction clutch; gear change control means for operating the gear position change-over means in accordance with engagement/disengagement of the friction clutch, so that the speed ratio of the transmission coincides with that determined by the gear change-judging means; fuel quantity increase-control means for moving the control rack after the operation of the gear position change-over means is completed, so that the rotational speed of the output shaft substantially coincides with that of the input shaft; clutch control means for operating the clutch actuator in accordance with a signal from the fuel quantity increase-control means, to move the friction clutch in the engagement direction; and rack-return control means for operating the rack actuator, to gradually move the control rack to a position corresponding to the degree of depression of an accelerator pedal (detected by the drive state-detection means) when the rack-return control means detects that a difference in the rotational speed of the output and input shafts (obtained from the drive state-detection means) has decreased below a predetermined value during operation of the clutch actuator.

According to the automatic transmission apparatus of the present invention, a conventional drive system, such as a friction clutch, a parallel shaft-type gear transmission, or the like, is utilized without being modified, and the actuator of the friction clutch and the power cylinder of the gear position switch means are actuated by air supplied from an air tank incorporated in the vehicle, to perform a gear changing operation. Therefore, a low-cost automatic transmission apparatus can be obtained without the need to greatly modify conventional production lines for vehicles. Upon shifting down of the changing gear, the control rack of the fuel injection pump is gradually moved immediately before disengagement of and immediately after engagement of the friction clutch, respectively, thus preventing an abrupt change in engine speed. Therefore, changing gear shock generated during the changing gear operation can be reduced, thus allowing a smooth gear changing operation.

BRIEF DESCRIPTION OF THE DRAWINGS

FIGS. 5(a) and 5(b) to FIGS. 8(a), 8(b), and 8(c) are flow charts of a control program;

FIGS. 13 and 14 are flow charts of a control program according to a second embodiment of the present invention;

FIG. 15 is a graph showing the relationship between vehicle speed and engine speed according to the second embodiment;

FIG. 16 is a graph showing a change over time in engine speed and clutch output shaft speed according to the second embodiment; and FIG. 17 is a schematic circuit diagram of a third embodiment.

DETAILED DESCRIPTION OF THE INVENTION

Figure 1:
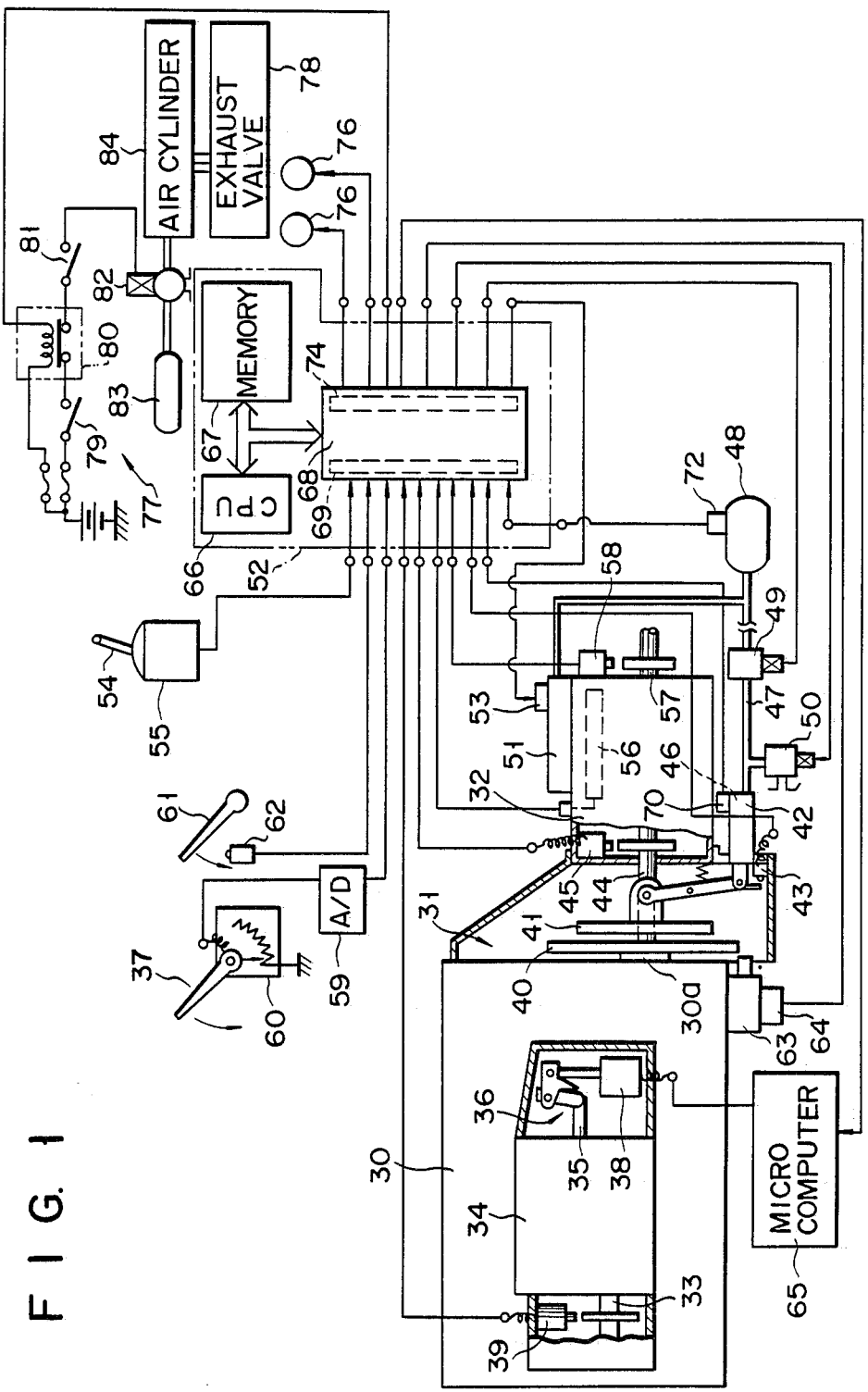
FIG. 1 is a schematic diagram of an automatic transmission apparatus according to a first embodiment of the present invention.
Figure 2:
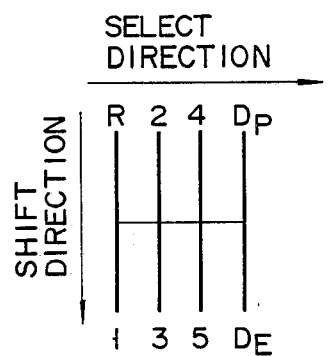
FIG. 2 is an illustration showing a shift pattern of the apparatus shown in FIG. 1.
Figure 4:
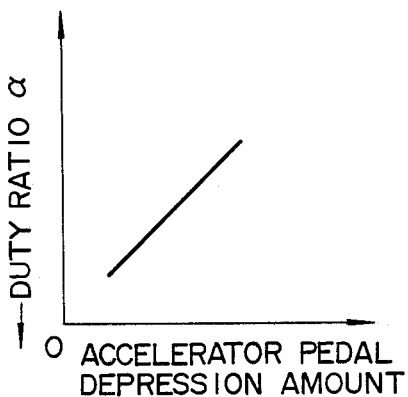
FIG. 4 is a graph showing a map for determining a duty ratio.
Figure 3:
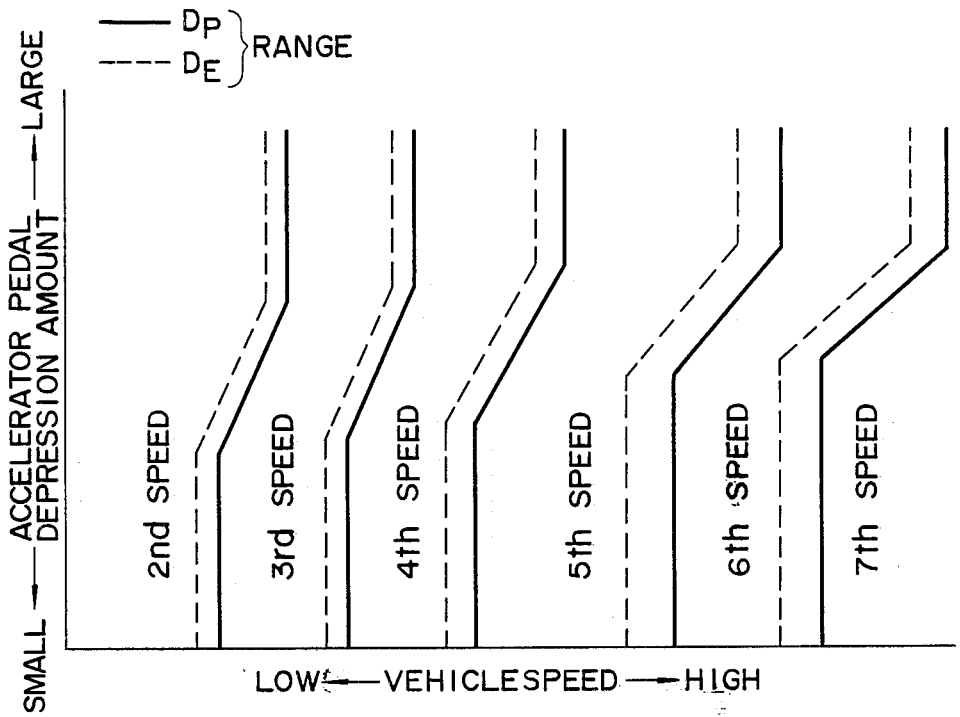
FIG. 3 is a graph showing transmission characteristics of DP and DE ranges.

An embodiment of the present invention will be described with reference to the accompanying drawings:

In a first embodiment (shown in FIGS. 1 to 12), as shown in FIG. 1, an automatic transmission apparatus is arranged between diesel engine (to be referred to simply as "engine" hereinafter) 30 and parallel shaft-type gear transmission 32 which receives the rotational force from output shaft 30a, of engine 30, through friction clutch 31. Fuel injection pumps (to be referred to as injection pump hereinafter) 34, each of which comprises input shaft 33 rotated at a speed ½ that of output shaft 30a, are mounted on engine 30. Solenoid actuator 38 is coupled to each control rack 35, of pump 34, through link 36, and engine speed sensor 39 for generating a rotational speed signal of output shaft 30a, is provided on input shaft 33. Friction clutch 31 urges clutch disk 41 against flywheel 40 by a known clamping means (not shown). When air cylinder 42, serving as a clutch actuator, is switched from an inactive state to an active state, the clamping means is actuated in the release direction, and clutch 31 is changed from an engaged state to a disengaged state (FIG. 1 illustrates the disengaged state). Note that clutch 31 has clutch stroke sensor 70 for detecting the disengaged or engaged state of clutch 31 upon its ON/OFF operation. However, clutch touch sensor 43 can be used in place of sensor 70. Input shaft 44 of gear transmission 32 has clutch speed sensor 45 for generating a signal representing the rotational speed of input shaft 44 (to be referred to as clutch speed hereinafter). Air chamber 46, of air cylinder 42, communicates with air path 47, which is coupled to air tank 48, as a high-pressure air source. Solenoid cut valve 49, serving as switching means for controlling the actuating air supply, is mounted midway along air path 47, and normally closed solenoid valve 50, which is duty controlled to release air chamber 46 to ambient pressure, is mounted in addition thereto. Clutch stroke sensor 70 is mounted on air cylinder 42 and generates an ON signal when the internal air pressure exceeds a predetermined value corresponding to the disengaged state of clutch 31. Air sensor 72 is mounted on air tank 48 and generates an ON signal when the internal air pressure decreases below the predetermined value. In order to change the speed ratio of transmission 32, to obtain a desired transmission range, the driver moves gear shift lever 54 to a position corresponding to the shift pattern shown in FIG. 2, gear shift unit 51, serving as a gear position switch means, is operated in accordance with a signal received by transmission range-selection switch 55, and the speed ratio is changed to a target speed ratio corresponding to the shift pattern. Note that in FIG. 2, R indicates a reverse range, N indicates a neutral range, 1, 2, 3, 4, and 5 respectively indicate corresponding designation transmission ranges, and DP and DE indicate automatic transmission ranges varying between the 2nd speed and 7th speed. When the DP or DE range is selected, one of the 2nd to 7th speeds is automatically determined, in accordance with the drive conditions of the vehicle, by optimal transmission range-determination processing (to be described later). FIG. 3 shows transmission regions of "power" automatic transmission range DP and "economy" transmission range DE. As shown in FIG. 3, transmission timings of the 2nd to 7th speeds of the DP range, indicated by solid lines, are set at the higher speed side, compared to those of the DE range, indicated by broken lines, so as to cope with the high load state of the vehicle. Gear shift unit 51 has a plurality of solenoid valves 53 (FIG. 1 illustrates one of them) operated in accordance with an operation signal from control unit 52, and a pair of power cylinders (not shown) for actuating a select fork and a shift fork (neither are shown) of gear transmission 32 upon supply of high-pressure air from air tank 48. Gear shift unit 51 operates the power cylinders in accordance with the operation signal supplied to solenoid valves 53, to change the meshing state of gear transmission 32, in the order of the select and shift directions. In addition, gear shift unit 51 is provided with gear position switches 56 serving as sensors for detecting the speed ratio, and gear position signals from gear position switches 56 are output to control unit 52. Vehicle speed sensor 58 for generating a vehicle speed signal, is provided on output shaft 57, of gear transmission 32, and accelerator load sensor 60 is mounted on accelerator pedal 37. Accelerator load sensor 60 produces a change in resistance corresponding to the degree of depression of accelerator pedal 37, in the form of a voltage value, and converts this voltage value into a digital signal by means of A/D converter 59. When brake pedal 61 is depressed, brake sensor 62 outputs a high-level brake signal. Starter 63 is mounted on engine 30 and meshes with an outer circumferential ring gear of flywheel 40 to start engine 30, as required. Starter relay 64, of starter 63, is connected to control unit 52. Note that reference numeral 65 denotes a microcomputer arranged in a vehicle for various control operations, in addition to control unit 52. Microprocessor 65 receives input signals from sensors (not shown) to perform drive control of engine 30. Microcomputer 65 supplies an operation signal to solenoid actuator 38, of injection pump 34, and can control the rotational speed of output shaft 30a, of engine 30 (to be referred to as an engine speed hereinafter), by means of a fuel increase/decrease operation.

Control unit 52 is a microcomputer especially for controlling the automatic transmission apparatus, and comprises microprocessor (to be referred to as CPU hereinafter) 66, memory 67, and interface 68 serving as an input signal processing circuit. Input port 69, of interface 68, receives output signals from transmission range-selection switch 55, brake sensor 62, accelerator load sensor 60, engine speed sensor 39, clutch speed sensor 45, gear position switches 56, vehicle speed sensor 58, clutch touch sensor 43 (used when detecting the disengaged or engaged state of friction clutch 31, in place of clutch stroke sensor 70), clutch stroke sensor 70, and air sensor 72. Output port 74, of interface 68, is connected to microcomputer 65, starter relay 64, solenoid valves 50 and 53, and cut valve 49, and can supply an output signal thereto. Reference numeral 75 denotes an air warning lamp which is turned on in response to the output from a drive circuit (not shown) when the air pressure in air tank 48 does not reach a preset value; and numeral 76 denotes a clutch warning lamp which is turned on in response to the output when the degree of wear of friction clutch 31 exceeds a predetermined value.

Exhaust brake drive circuit 77 operates exhaust valve 78 serving as a butterfly valve which opens and closes the exhaust path (not shown) of the engine, and comprises a series circuit of exhaust brake switch 79, exhaust brake cut relay 80 as a switch means, and accelerator switch 81. When all these switches are turned on, an energization current can be supplied to solenoid valve 82. Note that exhaust brake switch 79 is a normally open switch, and serves as a main switch for an exhaust brake operation. The accelerator switch is turned on only when the degree of depression of the accelerator pedal (not shown) is zero, and exhaust brake cut relay 80 turns off its normally closed contact by means of an energization current (to be described later).

Solenoid valve 82 is a three-port type having an air release opening, and connects air tank 83 and air cylinder 84 as the exhaust valve actuator, in the ON state and releases air cylinder 84 to ambient pressure, in the OFF state. Air cylinder 84 opens or closes exhaust valve 78 through a link (not shown), and opens exhaust valve 78 when the clutch disengagement signal (to be described later) is in the ON state.

Memory 67 comprises a read-only memory (ROM) storing a control program shown in the flow charts in FIGS. 5 to 8 and data, and a random-access memory (RAM). More specifically, the ROM prestores duty ratio α of solenoid valve 50 corresponding to the accelerator load signal, in the form of a map shown in FIG. 4, in addition to the program, and the corresponding value is read out therefrom by referring to the map. Transmission range-selection switch 55 outputs a select signal and a shift signal. A transmission range position corresponding to the combination of the select and shift signals is prestored in the ROM as a data map. Upon receiving the select and shift signals, the data map is referred to, so as to output the corresponding signal to solenoid valves 53 of gear shift unit 51, thereby adjusting the speed ratio to the target speed ratio corresponding to the transmission signal. In this case, the gear position signal from gear position switch 56 is output when the changing gear operation is completed, and is used to check if all the gear position signals corresponding to the select and shift signals are generated, and to produce a signal representing a normal or abnormal meshing state. In addition, the ROM stores a map for determining an optimal speed ratio in accordance with the vehicle speed, accelerator load, and engine speed signals, when the target speed ratio falls within the DP or DE range.

The changing gear control procedure of this embodiment will now be described with reference to FIGS. 5 to 8.

Figure 5A:
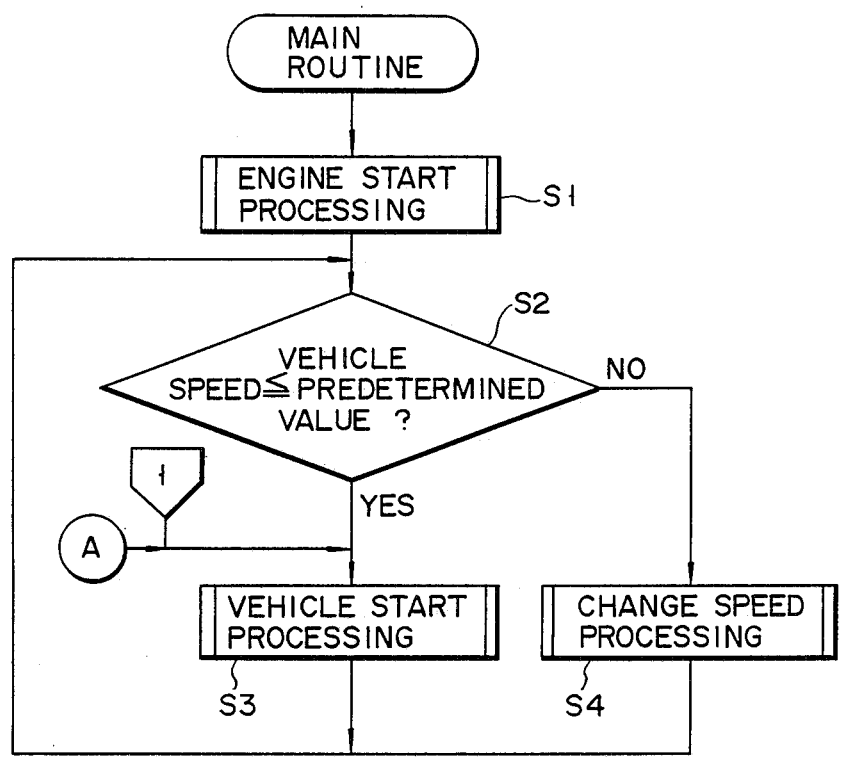
Figure 5B:
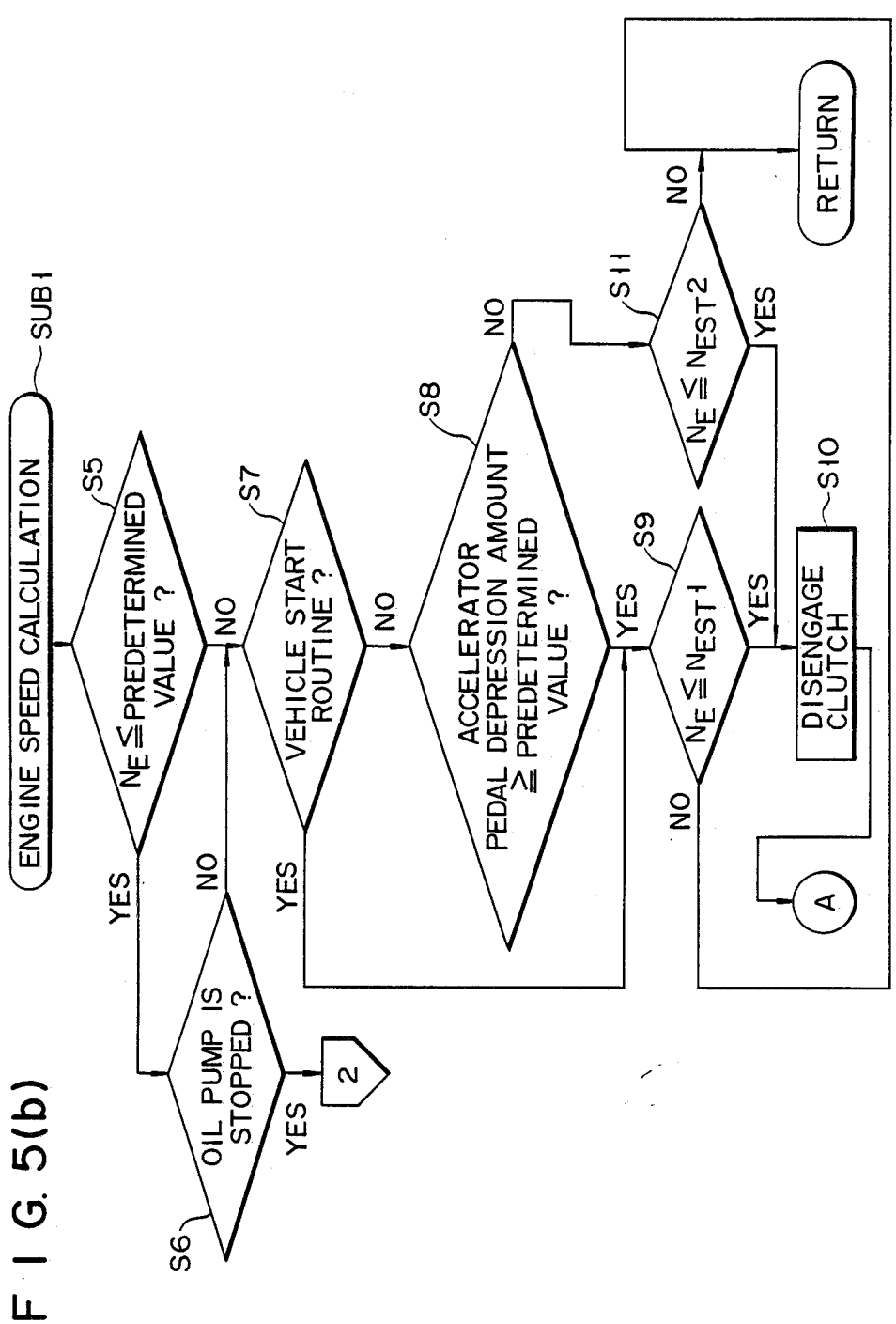

As shown in FIGS. 5(a) and 5(b), after the program starts, control unit 52 executes the engine start processing routine (step 1: note that it is indicated by S1 in the drawing). After the engine start processing routine, control unit 52 receives the vehicle speed signal. When the signal is below the predetermined value (e.g., 0 km/h to 3 km/h) (step 2), control unit 52 performs the vehicle start processing routine (step 3), and when the signal exceeds the predetermined value, it performs the changing gear processing routine (step 4). However, when engine speed NE is equal to or below a predetermined value (e.g., an idling speed) before it is calculated (subroutine 1) and the vehicle start processing routine has been performed (step 5), a check is made to determine whether the oil pump is stopped (step 6). If the oil pump is stopped, it is determined that the engine is stopped, and the engine start processing routine is performed again. If the oil pump is not stopped or if engine speed NE exceeds the predetermined value, a check is made to determine whether control has entered the vehicle start routine (step 7). If the control does not enter the vehicle start routine, the degree of depression of the accelerator pedal (to be referred to as an accelerator load signal) is compared with a predetermined value (step 8) to check if the driver wants to start the vehicle. During the vehicle start processing routine, or if the accelerator load signal exceeds the predetermined value, engine speed NE is compared with first engine stop prevention speed NEST1 (step 9). If engine speed NE is equal to or below first engine stop prevention speed NEST1, friction clutch 31 is disengaged (step 10), and the vehicle start processing routine is performed. If the accelerator load signal is below the predetermined value, engine speed NE is compared with second engine stop prevention speed NEST2, higher than first engine stop prevention speed NEST1 (step 11). If engine speed NE is equal to or below second engine stop prevention speed NEST2, the clutch is disengaged (step 10) and the vehicle start processing routine is performed. However, if engine speed NE exceeds second engine stop prevention speed NEST2, or if engine speed NE exceeds first engine stop prevention speed NEST1, control returns to normal processing.

In the engine start processing routine (step 1) shown in FIG. 6, a signal corresponding to engine speed NE is input, and a check is made to determine whether the signal falls within the stop region of engine 30 (step 12). When engine 30 is stopped, a clutch engagement signal is output (step 13). After a time lag (step 14), friction clutch 31 is engaged at a normal pressure and in a normal condition. When friction clutch 31 is engaged thus, a position (to be referred to as an LE point hereinafter), corresponding to a clutch partially-engaged state (wherein friction clutch 31 is disengaged to the extent that the drive wheels of the vehicle are changed from a rotating state to a stationery state) is adjusted in accordance with the degree of wear of the facing of friction clutch 31 or the presence/absence of a load (step 15). More specifically, the stroke of clutch disk 41, from the LE point until friction clutch 31 is fully engaged, can be substantially constant, and friction clutch 31 can be smoothly engaged regardless of the vehicle state. When the LE point is adjusted, a check is made to determine whether the position of gear shift lever 54 coincides with the speed ratio (step 16), i.e., whether the transmission signal coincides with the gear position signal and whether the speed ratio of transmission 32 corresponds to the target speed ratio designated by transmission range-selection switch 55 (if the DE or DP range is selected, the target speed ratio is predetermined as the 2nd speed). If the position of gear shift lever 54 is different from the speed ratio, a check is made to determine whether the air pressure in air tank 48 (serving as a main tank) has reached a predetermined value (step 17). When the air pressure has reached the predetermined value, friction clutch 31 is disengaged (step 18), and an actuator (not shown) is operated by the air pressure from air tank 48, to automatically adjust the gear position to that of gear shift lever 54 (step 19). Then, friction clutch 31 is engaged (step 20), and after a solenoid valve for switching air tank 48 and a subtank (not shown) is turned off (step 21), a check is again made to determine whether the position of gear shift lever 54 coincides with the speed ratio. If the air pressure in air tank 48 has not reached the predetermined value, a check is made to determine whether the air pressure in the subtank has reached the predetermined value (step 22). When the air pressure in the subtank has reached the predetermined value, the switching solenoid valve is turned on (step 23), and friction clutch 31 is disengaged. Then, the power cylinders are operated by the air pressure from the subtank, to automatically select the speed ratio corresponding to the position of gear shift lever 54. When the air pressure in the subtank has not reached the predetermined value, air warning lamp 75 is illuminated (step 24), thus notifying the driver that the air pressure in air tank 48 and in the subtank is below the predetermined value. If the position of gear shift lever 54 coincides with the speed ratio, the starter relay is turned on (step 25). When the starter relay is turned on, starter 63 is activated, and engine 30 is started. Then a check is made to determine whether engine 30 is operating (step 26). If engine 30 has started, the starter relay is turned off (step 27). If engine 30 has not started, a check is again made to determine whether the position of gear shift lever 54 coincides with the speed ratio (step 16). When the starter relay is turned off, a check is made to determine whether the air pressure in air tank 48 and in the subtank has reached the predetermined value (step 28). If the air pressure has not reached the predetermined value, air warning lamp 75 is turned on (step 29). Step 28 is repeated until the air pressure reaches the predetermined value. When the air pressure reaches the predetermined value, air warning lamp 75 is turned off (step 30), thus completing the engine start processing routine.

Figures 1, 7A:
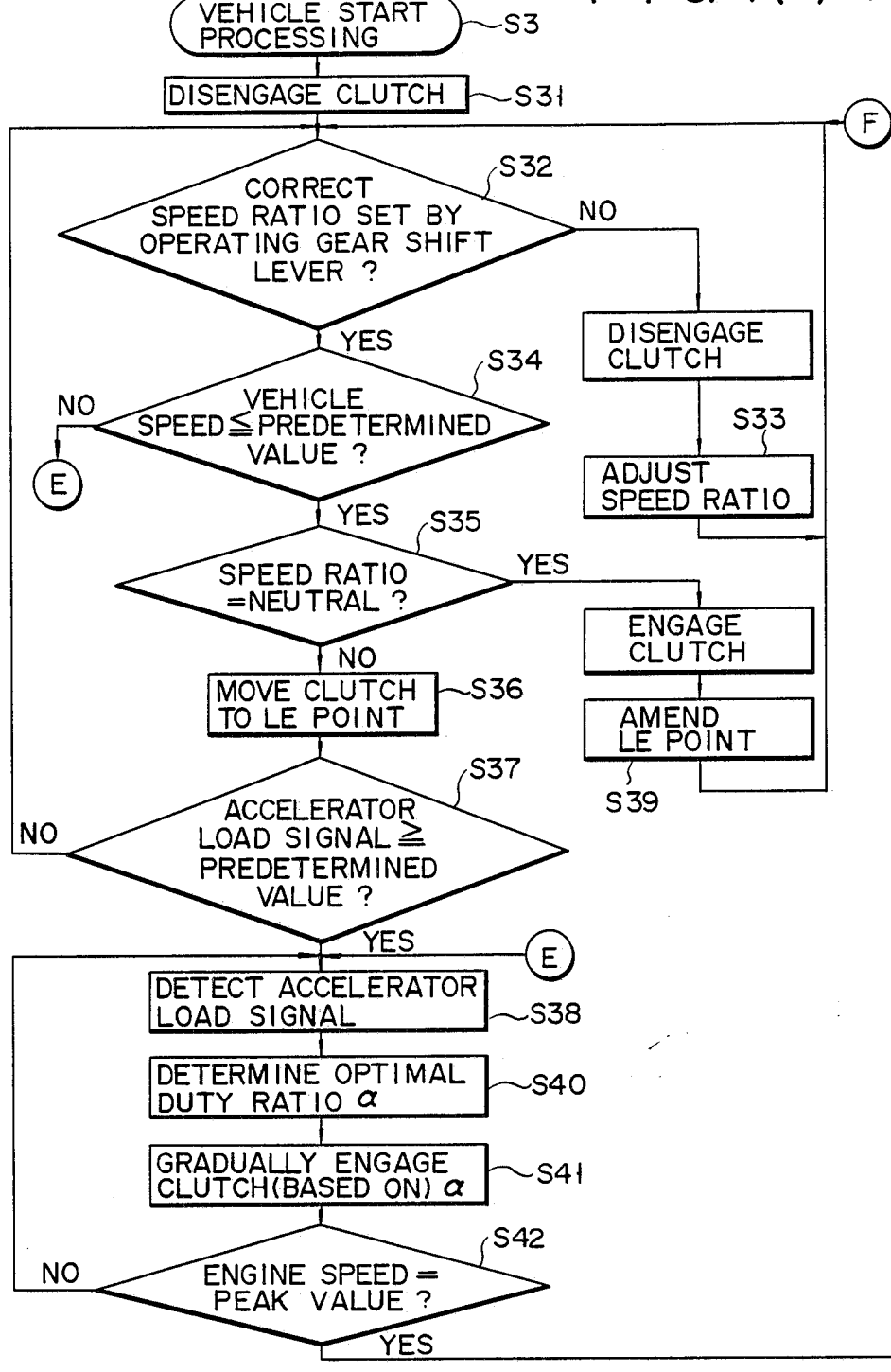
Figures 2, 7A:
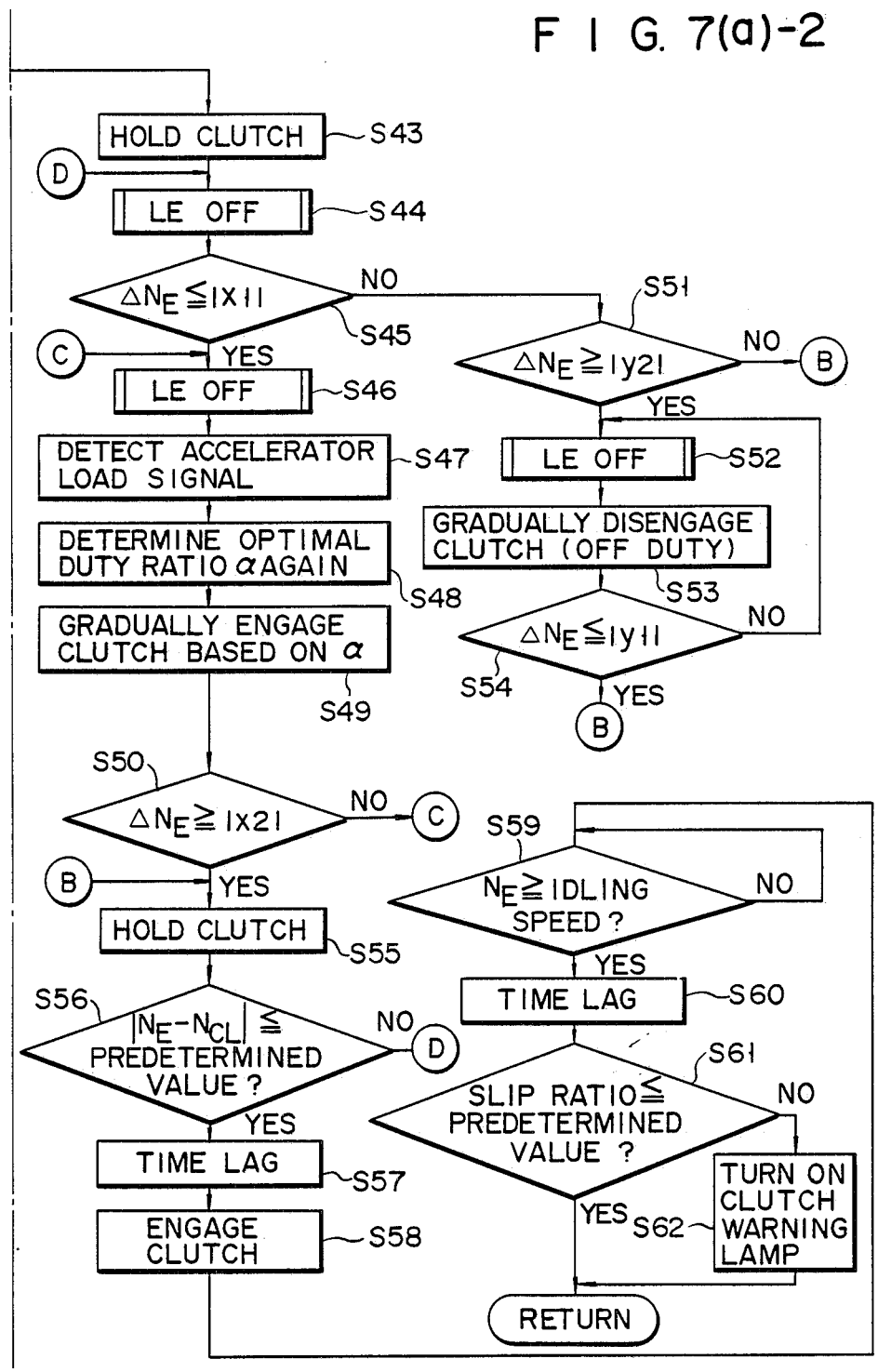
Figure 7B:
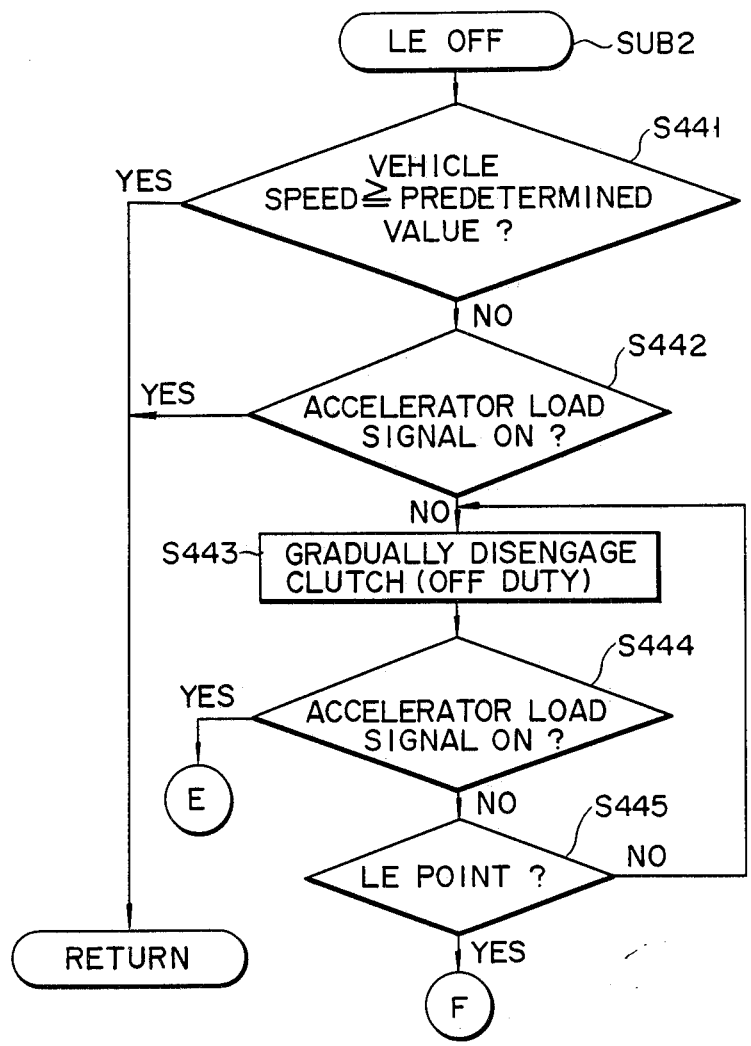
Figure 9:
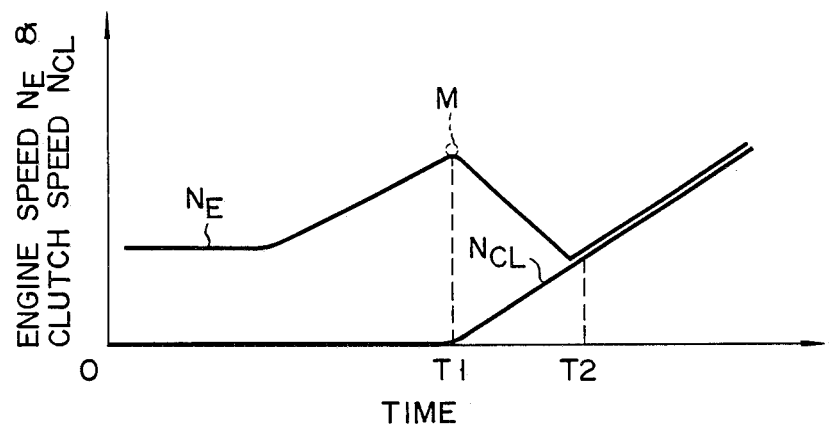
FIG. 9 is a graph showing a change over time in engine speed and clutch speed during a changing gear operation.
Figure 10:
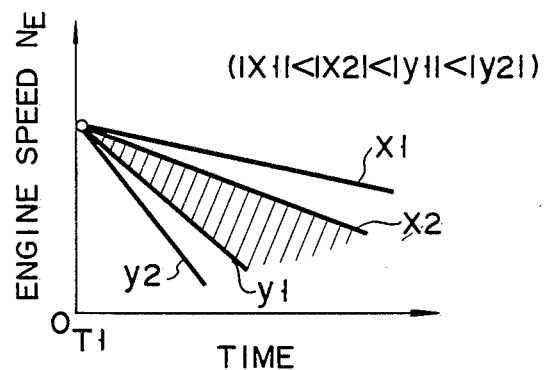
FIG. 10 is a graph showing a region of a rate of change in the engine speed during the changing gear operation.

After the engine start processing routine is completed, the vehicle speed signal is fetched, and when the signal is below the predetermined value, control enters the vehicle start processing routine (step 3). As shown in FIGS. 7(a) and 7(b), CPU 66 supplies an ON signal to solenoid cut valve 49, to disengage friction clutch 31 (step 31). Next, a check is made to determine whether the position of gear shift lever 54 coincides with the speed ratio (step 32). If NO in step 32, the gear position is adjusted to the target transmission range (step 33). If the position of gear shift lever 54 coincides with the speed ratio, a check is made to determine whether the vehicle speed is lower than the predetermined value (step 34). If the vehicle speed exceeds the predetermined value, i.e., if NO in step 34, the flow advances to the step of detecting the accelerator load signal (step 38). If the vehicle speed is below the predetermined value, i.e., if YES in step 34, a check is made, in accordance with the transmission signal, to determine whether the gear position corresponding to the target transmission range falls in the neutral range (step 35). If YES in step 35, LE point correction is performed (step 39). However, if the speed ratio is in other than the neutral range, i.e., if NO in step 35, friction clutch 31 is engaged to the LE point (step 36). A check is then made to determine whether the accelerator load signal value exceeds a predetermined value (a voltage low enough to indicate that the driver intends to start the vehicle) (step 37). If the driver does not intend to start the vehicle, i.e., if NO in step 37, the previous steps are repeated. If it is determined that the driver intends to start the vehicle, i.e., if YES in step 37, the flow advances to step 38, and the accelerator load signal value is detected, and optimal duty ratio α corresponding to this value is read out from the map shown in FIG. 4 (step 40). A pulse signal corresponding to optimal duty ratio o is supplied to solenoid valve 50, thus gradually engaging friction clutch 31 (step 41). At this time, CPU 66 supplies a selection signal to input port 69, to continuously receive the signal corresponding to engine speed NE. Engine speeds NE are time-serially stored in the RAM in memory 67 in accordance with the signals of engine speeds NE, and calculation processing is performed to obtain peak point M (step 42), as shown in FIG. 9, showing changes in engine speed NE and clutch speed NCL. NO is obtained in step 42 until peak point M is detected, and control is repeated from the accelerator load signal detection step. When peak point M is detected, solenoid valve 50 is held in the ON state from time T1 (step 43). Note that peak point M appears at the time the rotational speed of output shaft 30a of engine 30 is decreased when rotational power of input shaft 44, of gear transmission 32, begins to be transmitted to the drive wheel side through friction clutch 31.

Next, an LEOFF routine, indicated by subroutine 2, is executed (step 44). The LEOFF routine copes with a case wherein the vehicle is slowly started while maintaining the clutch partially-engaged state, as shown in FIG. 7(b), unlike the normal vehicle start processing routine. In the LEOFF routine, a check is made to determine whether the vehicle speed is equal to or larger than the predetermined value (step 441). If the vehicle speed is equal to or larger than the predetermined value, i.e., if YES in step 441, it is thus determined that the normal vehicle start processing routine has performed, the LEOFF routine ends, control returns to the normal vehicle start processing routine, and the flow advances to step 45. If NO in step 441, a check is made to determine whether the accelerator pedal is depressed (step 442). If YES in step 442, the LEOFF routine ends in the same manner as in step 441. However, if NO in step 442, friction clutch 31 is gradually disengaged without using the duty ratio, until the LE point is reached (step 443). During this interval, a check is also made to determine whether accelerator pedal 37 is depressed (step 444). If accelerator pedal 37 is depressed, control returns to the accelerator load signal detection step. After friction clutch 31 is disengaged to the LE point (step 445), control returns to the step of checking the position of gear shift lever 54 and the speed ratio.

If the LEOFF routine ends (step 44) and if it is determined that the normal vehicle start processing has been performed, friction clutch 31 is engaged from the clutch partially-engaged state at the LE point, to obtain a clutch fully-engaged state. At this time, since engine speed NE after peak point M is gradually decreased upon increase in clutch speed NCL corresponding to the rotation of input shaft 44, of gear transmission 32, engine speed NE is controlled, so that the decrease ratio thereof falls within a predetermined range, to reduce shock when the vehicle is started. More specifically, first a check is carried out to determine whether decrease ratio $\Delta NE$ of the engine speed is equal to or smaller than first preset value $|x1|$ shown in FIG. 10 (step 45). If YES in step 45, after the LEOFF routine indicated by subroutine 2 is executed (step 45), the accelerator load signal is detected again (step 47), optimal duty ratio α corresponding to this value is determined (step 48), and friction clutch 31 is gradually engaged with reference to duty ratio α (step 49). Thereafter, a check is made to determine whether decrease ratio $\Delta NE$ is equal to or smaller than second preset value $|x2|$ ($|x1| < |x2|$) (step 50). If NO in step 50, the flow returns to the LEOFF routine (step 46), and the loop for keeping decrease ratio $\Delta NE$ constant is repeated. If decrease ratio $\Delta NE$ of the engine speed is larger than $|x1|$ in step 45, a check is made to determine whether decrease ratio $\Delta NE$ is equal to or larger than third preset value $|y2|$ ($|x2| < |y2|$) (step 51). If YES in step 51, after the LEOFF routine in subroutine 2 in FIG.

7(b) is executed (step 52), friction clutch 31 is gradually disengaged by off duty (step 53). Thereafter, a check is made to determine whether decrease ratio $\Delta NE$ is equal to or lower than $|y1|$ ($|y1| < |y2|$) (step 54). If NO in step 54, the loop for disengaging friction clutch 31 is repeated. If YES in step 54, or if NO in step 51, i.e., if decrease ratio $\Delta NE$ is larger than $|y2|$, or if YES in step 50, i.e., if decrease ratio $\Delta NE$ is larger than $|x2|$, decrease ratio $\Delta NE$ substantially falls within a hatched region in FIG. 10. Therefore, since conditions for shifting friction clutch 31 from the clutch partially-engaged state to the fully-engaged state, without any accompanying shock and without unnecessarily prolonging the start time are satisfied, the current pneumatic pressure of friction clutch 31 is held (step 55). Thereafter, CPU 66 checks if the difference between engine speed NE and clutch speed NCL is equal to or lower than a predetermined value (e.g., $|NE-NCL| \approx 10$ rpm) (step 56). If NO in step 56, the above-mentioned loop is repeated (the flow returns to step 44). At time T2 (FIG. 9), at which YES is obtained in step 56, a predetermined time-delay period occurs (step 57), then solenoid valve 50 is fully opened and the friction clutch is engaged (step 58). Thereafter, after a predetermined time-delay period (step 60) wherein engine speed NE exceeds an idling speed (step 59), CPU 66 calculates a slip ratio ={ (difference between engine speed NE and clutch speed NCL)/clutch speed NCL} and compares said slip ratio with a predetermined value (step 61). If the slip ratio is below the predetermined value, the flow returns to the main routine. If the slip ratio exceeds the predetermined value, it is determined that the degree of wear of friction clutch 31 is large, and an ON signal, indicating clutch wear, is supplied to clutch warning lamp 76 through output port 74 and a drive circuit (not shown), thereby turning on clutch warning lamp 76 (step 62).

Figure 8A:
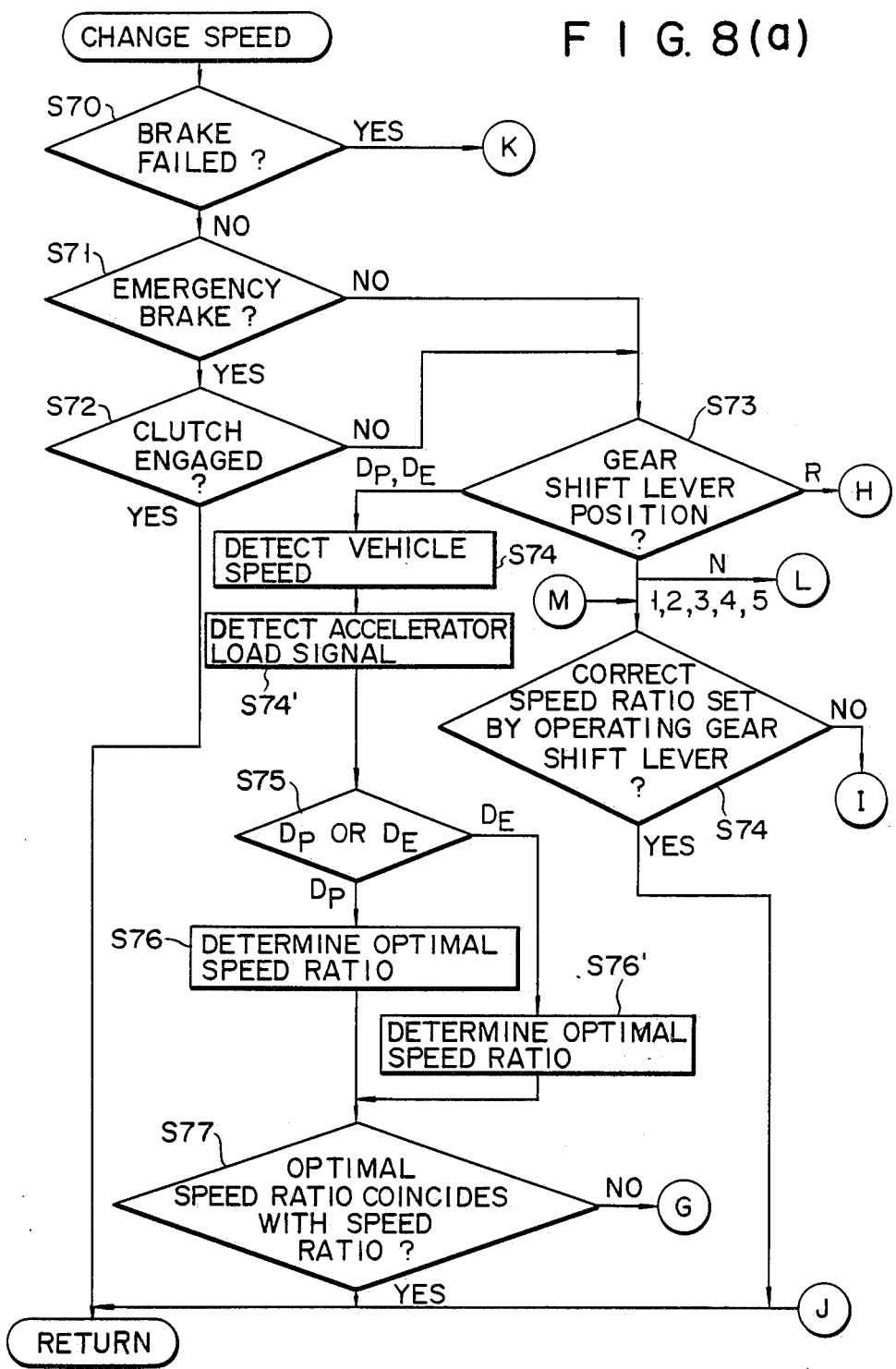
Figures 1, 8B:
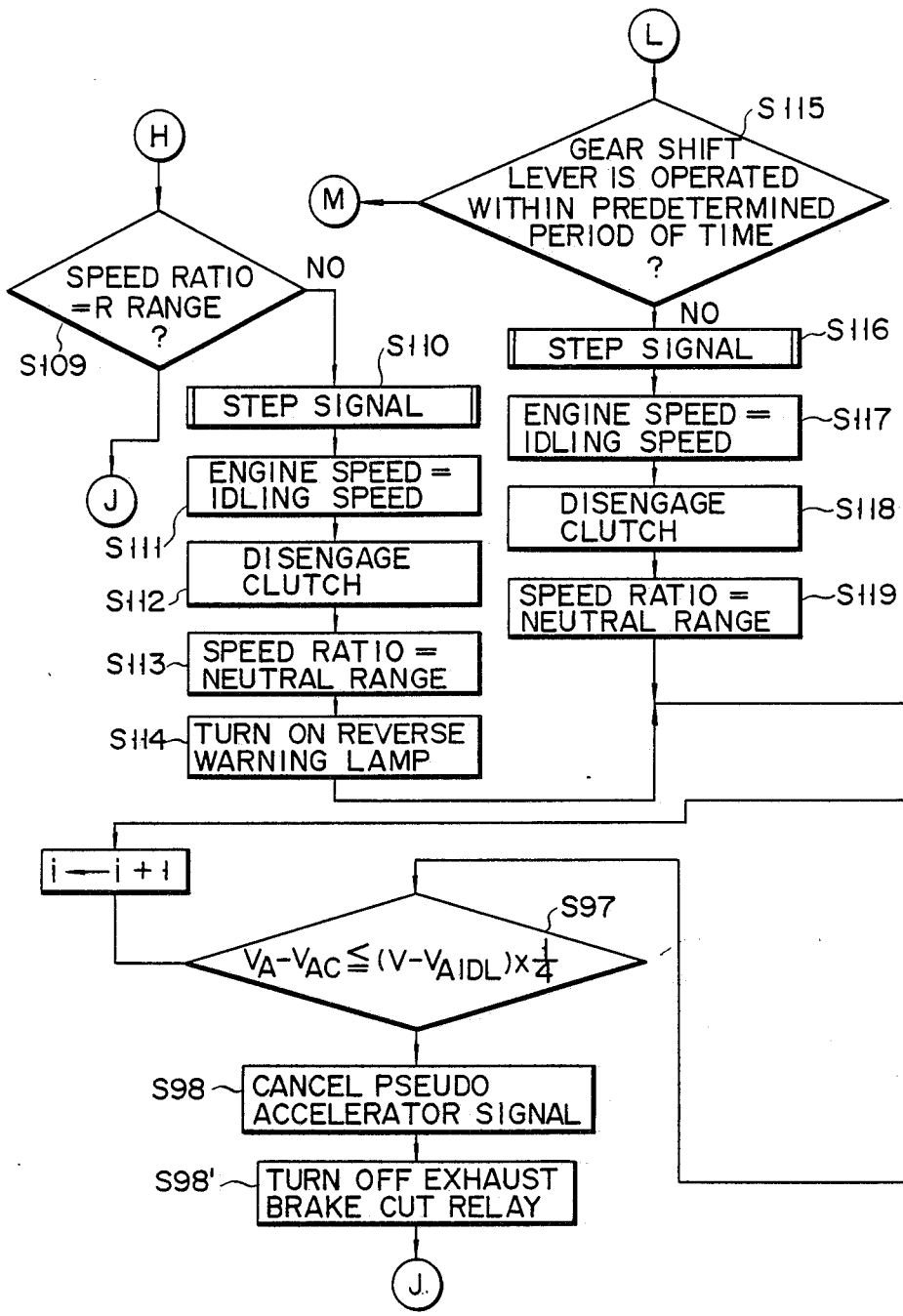
Figures 2, 8B:
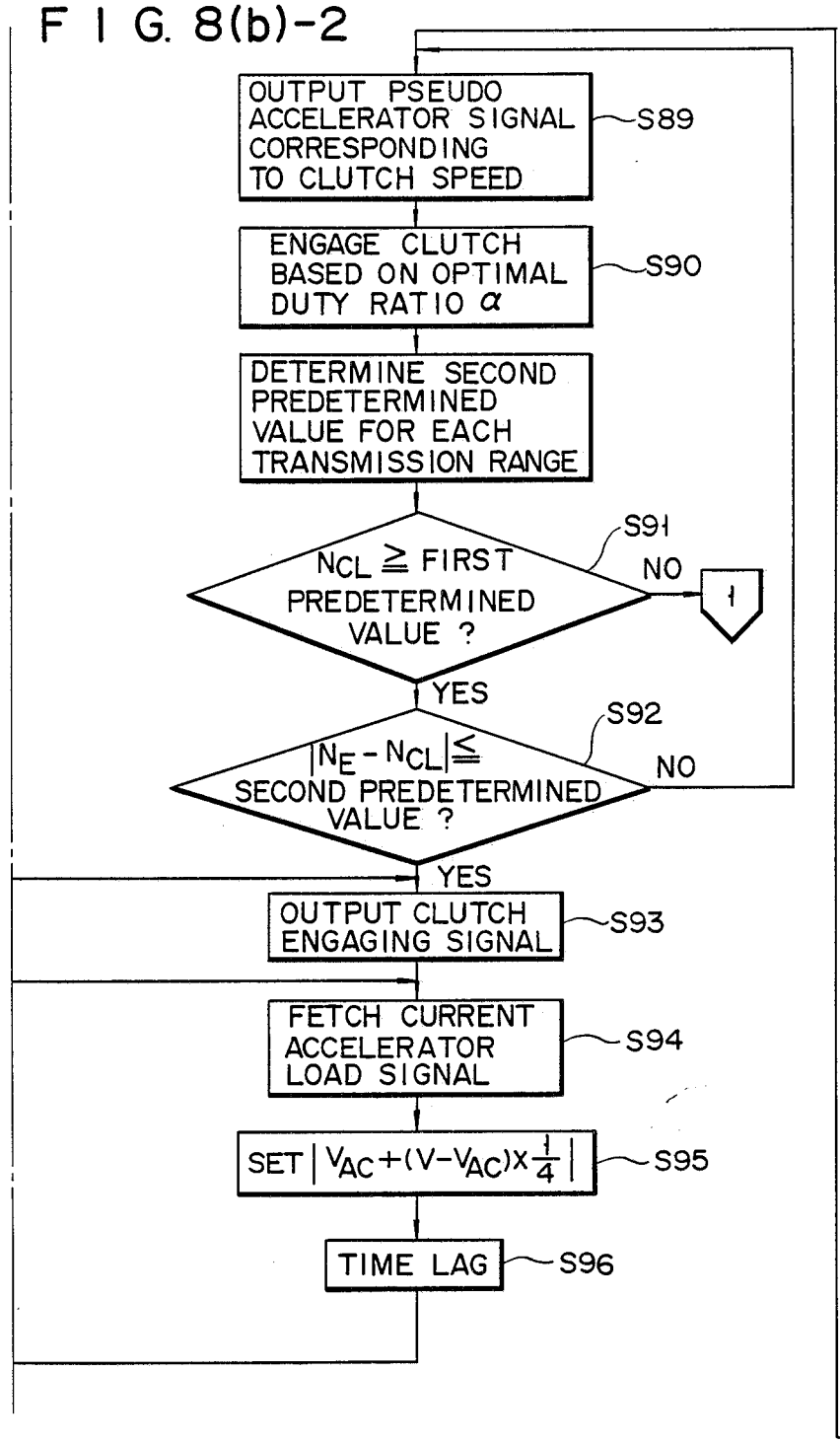
Figures 3, 8B:
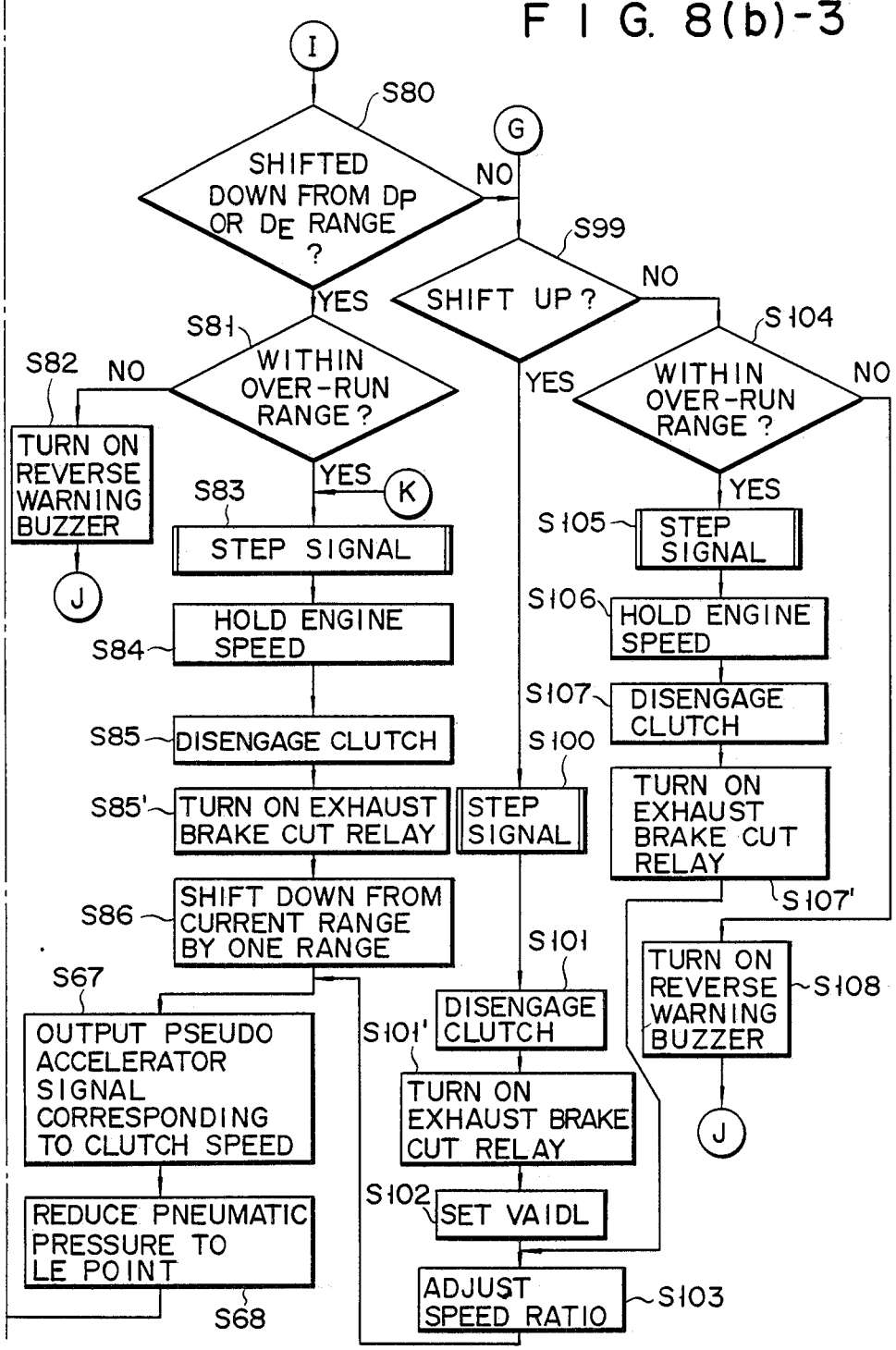
Figure 8C:
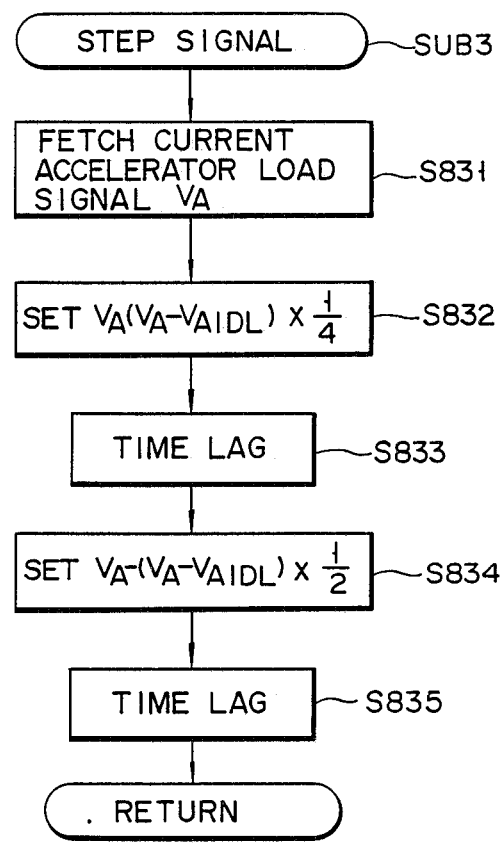

After the engine start processing routine has been completed, CPU 66 fetches the vehicle speed signal. If the vehicle speed signal exceeds a predetermined value, control enters the changing gear processing routine. As shown in FIGS. 8(a), 8(b), and 8(c), CPU 66 supplies a selection signal to input port 69 to check if brake fail signal is present (step 70). If YES in step 70, i.e., if brake fail signal is present, the shift-down operation is performed, down one range, in order to stop the vehicle, as will be described later. If NO in step 70, i.e., if no brake failure has occurred, a check is made using, for example, an acceleration sensor, to determined whether emergency braking with a given deceleration ratio or higher has been performed (step 71). If YES in step 71, when the changing gear operation (to be described later) is performed, the braking distance is prolonged unnecessarily. Therefore, the flow returns to the main routine, and the changing gear operation is interrupted. However, even if emergency braking has been performed, if friction clutch 31 has been disengaged (step 72), since it is determined that the changing gear processing routine is being performed, the changing gear operation is completed and friction clutch 31 is engaged.

If no emergency braking has been performed or if friction clutch 31 has been disengaged even during emergency braking as described above, the position of gear shift lever 54 is fetched, and a check is made to determine whether it falls within one of the 1st to 5th designated speed ratio, or in the DP or DE automatic transmission range (step 73).

Figure 11:
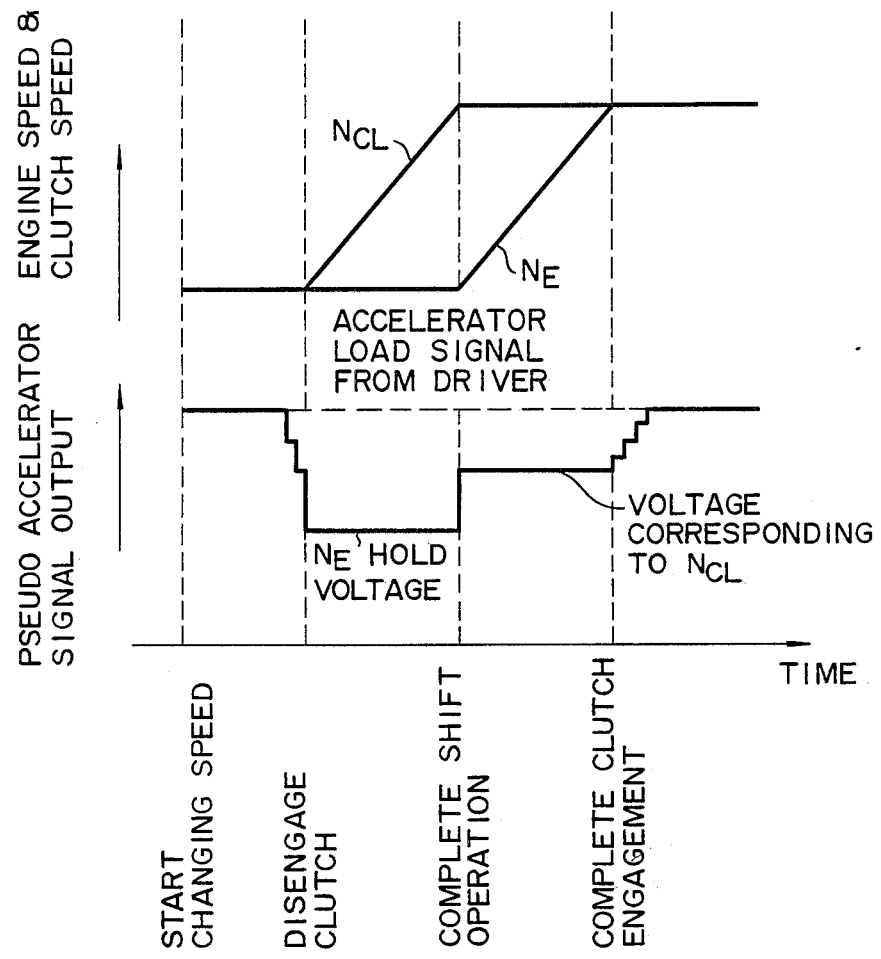
FIG. 11 is a timing chart of a shift-down operation.

When the position of gear shift lever 54 falls within the 1st to 5th designated speed ratio, a check is made to determine whether the position of gear shift lever 54 coincides with the speed ratio (step 74). If YES in step 74, the flow returns to the main routine, and if NO, the flow advances to the next step. In this step, since the position of gear shift lever 54 falls within one of the 1st to 5th target speed ratio, a check is made to determine whether the current gear position falls within the DP or DE range, and the shift-down operation is performed from this range (step 80), as shown in FIG. 8(b). If YES in step 80, a check is made to determine whether the shift-down operation can be performed without overrunning engine 30 (step 81). If NO in step 81, the flow advances to the next step, a reverse warning buzzer is turned on to indicate engine overrun to the driver (step 82), and the flow returns to the main routine without performing the changing gear operation. However, if YES in step 81, the shift-down operation is performed, down one range from the current gear position. FIG. 11 shows the principle of the shift-down operation. As shown in FIG. 11, a control signal for control rack 35 is output to solenoid actuator 38 through output port 74 and microcomputer 65, and control enters a step signal routine (step 53) indicated by subroutine 3. More specifically, accelerator load signal voltage VA, serving as a changing gear start signal during decision of the shift-down operation, is fetched (step 83), pseudo accelerator signal voltage VAC, lower than accelerator load signal voltage VA by ¼ the difference between idling voltage VAIDL and accelerator load signal voltage VA, is output for a predetermined period of time (e.g., 0.1 sec.) (step 832), and another pseudo accelerator signal voltage VAC, lower than previous voltage VAC by ¼ the same, is then output (step 834). Thereafter, engine speed NE is held (step 84). An ON signal is supplied to solenoid cut valve 49 through output port 74, for a predetermined period of time, to disengage friction clutch 31 (step 85), and exhaust brake cut relay 80 is turned on, to turn off solenoid valve 82 (step 85'). Next a control signal is supplied to solenoid valves 53 of gear shift unit 51, to perform the shift-down operation from the speed ratio before the changing gear operation, by one range (step 86). In this way, when the output signal to solenoid actuator 38 is decreased stepwise from accelerator load signal voltage VA without decreasing the engine hold voltage, transmission shock can be reduced. Note that in this embodiment, pseudo accelerator signal voltage VAC is decreased in two steps, but can be decreased in three steps or more, or gradually. Next, a voltage signal corresponding to clutch speed NCL (i.e., a signal for increasing engine speed NE) is supplied as a pseudo accelerator signal to solenoid actuator 38 through output port 74 and microcomputer 65 (step 87), so that clutch speed NCL, after the transmission operation, is adjusted to engine speed NE, and the pneumatic pressure in air cylinder 42 is reduced to move friction clutch 31, thus achieving the clutch partially-engaged state at the LE point (step 88). Friction clutch 31 is gradually engaged, based on optimal duty ratio $\alpha$ corresponding to the accelerator load signal (step 90), and the difference between engine speed NE and clutch speed NCL is compared with a second predetermined value for each speed ratio (step 92), thus repeating the engagement operation of friction clutch 31 based on duty ratio $\alpha$ until $|NE-NCL|$ is decreased below the predetermined value. After $|NE-NCL|$ is decreased below the second predetermined value, the clutch engagement signal is generated (step 93), accelerator load signal voltage VA at this time is fetched (step 94), and pseudo accelerator signal voltage VAC is increased by ¼ the difference between accelerator load signal voltage VA and pseudo accelerator signal voltage VAC (steps 95 and 6). This operation is repeated and when the difference between latest accelerator load signal voltage VA and latest pseudo accelerator signal voltage VAC is smaller than ¼ the difference between latest accelerator load signal voltage VA and idling voltage VAIDL applied to solenoid actuator 38 at the position of control rack 35 corresponding to the idling speed of engine 30 (step 97), the pseudo accelerator signal is canceled (step 98), exhaust brake cut relay 80 is turned off, and the flow then returns to the main routine. In this way, when the output signal to solenoid actuator 38 is increased stepwise without abruptly increasing it up to accelerator load signal voltage VA, transmission shock can be reduced. Note that pseudo accelerator signal voltage VAC can be increased gradually.

Figure 12:
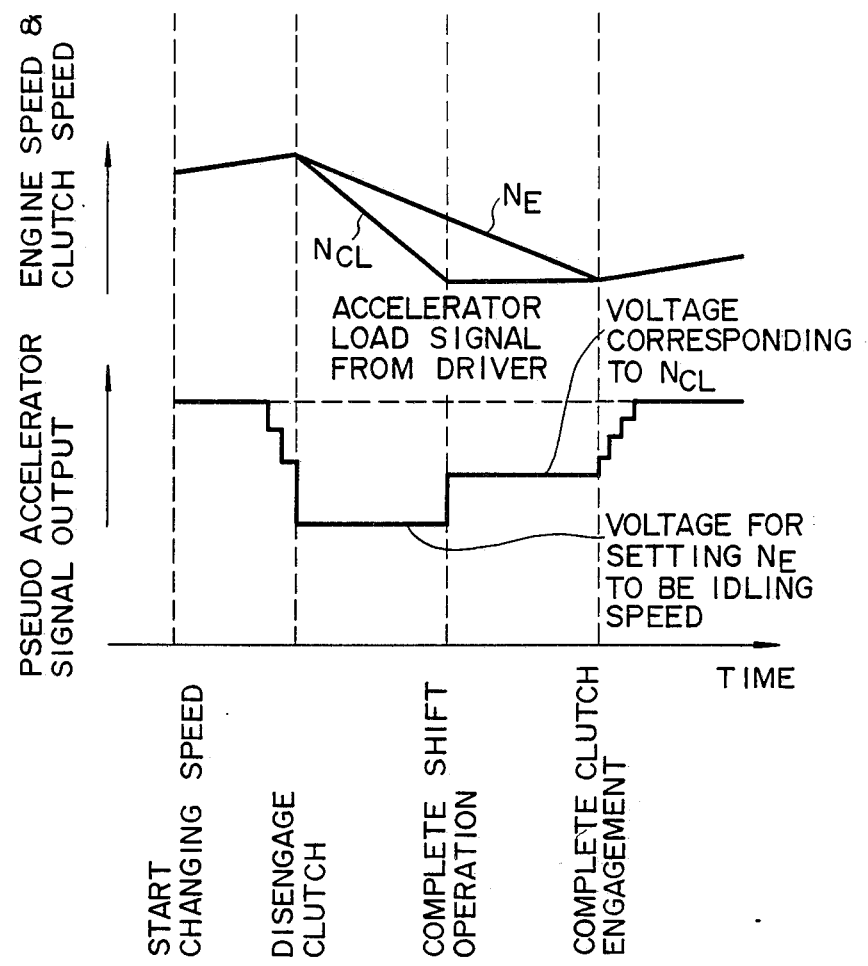
FIG. 12 is a timing chart of a shift-up operation.

If NO in step 80, i.e., if the shift-down operation is performed from the DP or DE range, a check is made to determine whether the shift-up operation has been performed (step 99). If YES in step 99, the shift-up operation is performed as follows, and the flow then returns to the main routine. FIG. 12 shows the principle of the shift-up operation. As shown in FIG. 12, a control signal for control rack 35 is supplied to solenoid actuator 38 through output port 74 and microcomputer 65. However, in this embodiment, control enters the step signal routine indicated by subroutine 3. Accelerator load signal voltage VA serving as the changing gear start signal during the judgement of the shift-up operation is fetched (step 831), and pseudo accelerator signal voltage VAC, lower than accelerator load signal voltage VA by ¼ the difference between idling voltage VAIDL and accelerator load signal voltage VA, is generated for a predetermined period of time (e.g., 0.1 sec.) (steps 832 and 833), and another pseudo accelerator signal voltage VAC, lower than the previous voltage VAC by ¼ the same, is generated (step 834). Thereafter, friction clutch 31 is disengaged (step 101), and exhaust brake cut relay 80 is turned on (step 101'), thus supplying idling voltage VAIDL to solenoid actuator 38 (step 102). In this way, when the output voltage to solenoid actuator 38 is decreased stepwise without abruptly decreasing it from accelerator load signal voltage VA to idling voltage VAIDL, changing gear shock can be reduced, and this effect is particularly significant when the shift-up operation is performed in the DE range. After friction clutch 31 is disengaged, a control signal is supplied to solenoid valves 53 through output port 74, so that the gear position will coincide with one target speed ratio of the 1st to 5th designated transmission ranges (step 103). Thereafter, the operation after output of the pseudo accelerator signal for the shift-down operation is performed (step 87), so that engine speed NE is adjusted to clutch speed NCL after the changing gear operation, friction clutch 31 is engaged, and the flow then returns to the main routine. Note that if NO in step 99, a check is made to determine whether the current engine speed falls outside the over-run range (step 104). If YES in step 104, in step signal routine 105 as subroutine 3, pseudo accelerator signal voltage VAC is generated stepwise while holding engine speed NE in the same manner as in the shift-down operation previously described, friction clutch 31 is disengaged, the gear position is adjusted to one target speed ratio of the 1st to 5th designated speed ratios, the operation after output of the pseudo accelerator signal of the shift-down operation is performed, and the flow then returns to the main routine. However, if NO in step 104, the warning buzzer is turned on (step 108).

The above operation is performed when it is determined in the judgement, in step 73, that the position of gear shift lever 54 falls in one of the 1st to 5th designated speed ratio. However, if it is determined in step 73 that the position of gear shift lever 54 falls in the DP or DE automatic transmission range, the following operation is performed. More specifically, the degree of depression of accelerator pedal 37 is detected (steps 74 and 74'), and a check is made to determine whether the position of gear shift lever 54 falls in the DP or DE range (step 75). Then, the optimal speed ratio regarded as the target speed ratio in the DP or DE range is determined from the predetermined map shown in FIG. 3 (steps 76 and 76'). Thereafter, a check is made to determine whether the gear position coincides with the optimal speed ratio (step 77). If YES in step 77, the flow returns to the main routine, and if NO, the flow advances to the step for checking if the shift-up operation has been performed (step 99 in FIG. 8(b)) and the same changing gear operation as described above, is performed.

If it is determined in step 73 that the position of gear shift lever 54 falls in the R range, a check is made in step 109, to determine whether the gear position coincides with the R range as the target speed ratio. If YES in step 109, i.e., if the vehicle is moving backward, the flow returns to the main routine. If NO in step 109, i.e., if an erroneous operation is detected, the operation in step signal routine 110 as subroutine 3 is performed. Subsequently, engine speed NE is adjusted to idling speed (step 111), and friction clutch 31 is disengaged (step 112). In order to return the speed ratio to the neutral range, a control signal is supplied to solenoid valves 53 through output port 74 (step 113), thus turning on the reverse warning lamp for signaling the erroneous transmission operation. Thereafter, steps 93 to 98 are executed to engage friction clutch 31, and the flow then returns to the main routine.

If it is determined in step 73 that the position of gear shift lever 54 falls in the N range, a check is made to determine whether gear shift lever 54 is shifted within a predetermined period of time (step 115), i.e., if shift lever 54 simply passes through the N range during the transmission operation by the driver. If YES in step 115, a check is made to determine whether the position of gear shift lever 54 coincides with the speed ratio (step 74), and the flow returns to the main routine with or without performing the shift-up or shift-down operation. However, if NO in step 115, i.e., if the N range is selected, step signal routine 116 indicated by subroutine 3 is executed, engine speed NE is decreased to idling speed (step 117), friction clutch 31 is disengaged (step 118), and the speed ratio is adjusted to the neutral range (step 119). Thereafter, steps 93 to 98 are executed to again engage friction clutch 31, and the flow returns to the main routine.

Note that in this embodiment, air cylinder 42 for actuating friction clutch 31 is driven by air pressure from air tank 48 incorporated in the vehicle. However, hydraulic pressure can alternatively be used as a control medium. In this case, however, a hydraulic pressure source (e.g., an oil pump) must be added, resulting in increased cost. The transmission control procedure, the shift pattern, and the like, can be modified as desired, and can be applied to a vehicle mounting a gasoline engine. For drivers who are accustomed to a manual transmission apparatus, a dummy clutch pedal can be added. In this case, the clutch pedal can have priority to air cylinder 42 in the R range or the 1st to 5th designated transmission ranges.

In a second embodiment shown in FIGS. 13 to 16, 0 functional blocks are added after steps 85', 101', and 107' in FIG. 8(*b*) of the first embodiment, so that a double clutch operation can be performed when the shift-down operation is performed, down to the 5th speed or lower.

In step 86, the shift-down operation is performed, down by one range from the current speed ratio, and a check is made to determine whether this operation has been performed, down to the 5th speed or lower (step 120). If the current speed ratio is the 5th speed or higher, gear shift unit 6 is operated, the speed ratio is shifted to the target speed ratio (step 123), and the flow advances to step 87.

If the shift-down operation is performed to the 5th range or lower in step 120, a check is made to determine whether the current vehicle speed is higher than a predetermined speed for each range (FIG. 15 shows predetermined vehicle speeds V1, V2, V3, V4, and V5 for the 1st to 5th speeds) (step 121). If the current vehicle speed is higher than the predetermined value, control enters the double clutch processing routine indicated by subroutine 4 in FIG. 14 (step 122); otherwise, the speed ratio is shifted down to the target speed ratio (step 23) and the flow advances to step 87. For example, when the shift-down operation is performed from the 3rd to the 2nd speed, since vehicle speed Va is larger than predetermined vehicle speed V2 in the 2nd speed, as shown in FIG. 15, control enters the double clutch processing routine (step 122). Conversely, if the vehicle speed is Vb, since V2>Vb, the flow advances to step 123.

Figure 14:
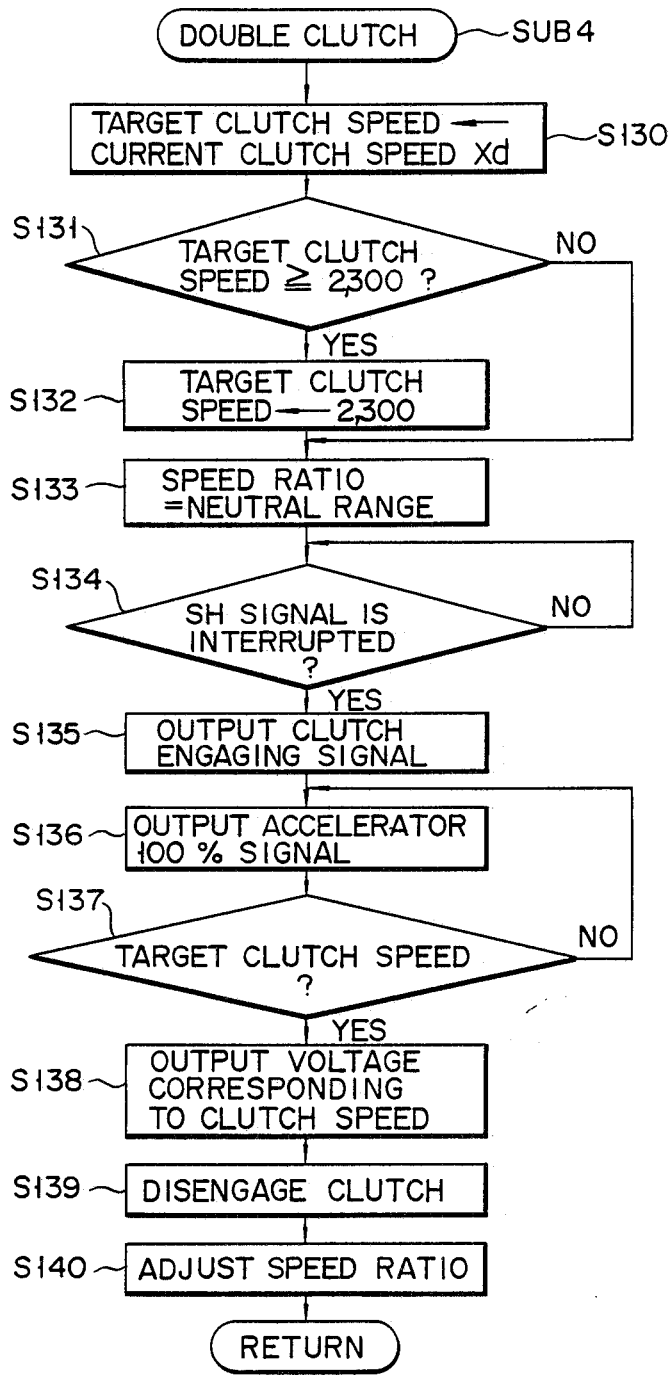

The subroutine (SUB 4) associated with the double clutch processing will now be described with reference to FIGS. 14 and 16.

As shown in FIG. 16, the clutch has been already disengaged at time T1, and a target clutch speed, after the shift-down operation, is determined based on the current clutch speed, in accordance with prestored coefficient α (step 130). Next, if determined target clutch speed NCL is equal to or larger than a predetermined value (in this embodiment, 2,300 rpm) (step 131), the target clutch speed is re-determined to be 2,300 rpm; otherwise, the flow advances to the next step. A signal for setting the gear position in the neutral range is generated (step 133), and if the judgement for starting the shift operation to the neutral range is made, i.e., if the speed ratio signal (SH signal) generated from the current transmission range is interrupted (step 134), the flow advances to the next step. At time T4, the clutch engagement signal is generated (step 135) and, immediately thereafter, a pseudo voltage is generated in order to increase the engine speed with the accelerator opening degree of 100% (step 136). Upon engagement of the clutch, clutch output shaft speed NCL is also increased immediately. Thereafter, if it is detected that clutch output shaft speed NCL has reached the target clutch speed (step 137), a voltage corresponding to the current clutch speed is generated (step 138). At time T5, the clutch is fully engaged, and after time T6, the clutch is disengaged (step 139). Subsequently, the speed ratio is switched to the target speed ratio (step 140), and the flow then returns to the main routine.

When the current speed ratio is lower than a given transmission range and the vehicle speed exceeds a predetermined value during the shift-down operation, after the double clutch operation is performed, the current speed ratio is switched to the target speed ratio. A clutch output shaft speed-increase interval and a clutch partially-engaged interval can be short unlike the prior art, and shift-down time period TB (see FIG. 16) can therefore be shortened. For this reason, the shift-down operation can be quickly performed, and engine braking time will not be lost due to the gear changing operation.

In the first embodiment, the analog output from accelerator load sensor 60 is converted by A/D converter 59 into a digital signal, and then supplied to microcomputer 65 through interface 68, while the vehicle is travelling normally. In the second embodiment, shown in FIG. 17, analog engine controller 65' is provided in place of microcomputer 65, and the output from accelerator load sensor 60 is input directly to engine controller 65' while the vehicle is travelling normally.

More specifically, control unit 52 receives accelerator signal SA as an analog signal from accelerator load sensor 60 of the vehicle, and supplies it directly to engine controller 65', while appropriately switching relay 90. In addition, control unit 52 causes a CPU as a central processing unit (not shown) to appropriately generate a pseudo accelerator signal as digital data. The digital data is converted to an analog signal by digital/analog converter (to be referred to as D/A converter hereinafter) 91 and is supplied to the relay 90 side. D/A converter 91 generates pseudo accelerator signal SA1 as an analog voltage signal. Buffer 92 has reference voltage terminal 94, which is connected to output terminal 650 for power source voltage VR of engine controller 65 through power source circuit 95. Note that power source circuit 95 is preferably provided with buffer 950 for preventing a voltage drop.

When the automatic transmission apparatus is operated and the vehicle is travelling normally, control unit 52 connects relay 90 at the accelerator load sensor 60 side to supply accelerator signal SA to engine controller 65'. When control unit 52 produces pseudo accelerator signal SA1 in the engine start or transmission mode of the vehicle, relay 90 is deenergized, and D/A converter 91 is connected to engine controller 65'. At this time, the pseudo accelerator signal determined in the digital circuit system is converted into an analog signal based on the same reference voltage VR 0 as in the engine controller 65' side. Therefore, engine controller 65' can control the engine speed in accordance with either accelerator signal SA or pseudo accelerator signal SA1, so that reference voltage VR coincides with the power source voltage at the engine controller 65' side.

In this manner, since pseudo accelerator signal SA1 determined by the control unit is generated as an analog signal based on the power source voltage of control unit 65', shifting caused by variations in voltages of both the controllers will not occur, and engine speed control in the vehicle start mode or transmission mode can be accurately performed.

We claim:

1. An automatic transmission apparatus for a vehicle comprising: a friction clutch coupled to an output shaft of an engine; a clutch actuator for operating said friction clutch; a parallel shaft type gear transmission, having an input shaft coupled to said friction clutch; gear position change-over means for changing the speed ratio of said transmission; a rack actuator for operating the control rack of a fuel injection pump for supplying fuel to said engine; and a control apparatus having a drive state-detection means for detecting the drive state of the vehicle; gear change-judging means for judging in accordance with a signal from said drive state-detection means when the speed ratio of said transmission is to be changed; fuel quantity decrease-control means for operating said rack actuator to gradually move said control rack to an idling speed position when the gear change-judging means judges that the speed ratio of said transmission is to be changed, clutch disengagement means for operating said clutch actuator after the operation of said fuel quantity decrease-control means, to disengage said friction clutch; gear change control means for operating said gear position change-over means in accordance with the disengagement of said friction clutch, so that the speed ratio of said transmission coincides with that determined by said gear change-judging means; fuel quantity increase-control means for moving said control rack after the operation of said gear position change-over means is completed, so that the rotational speed of said output shaft substantially coincides with that of said input shaft; clutch control means for operating said clutch actuator in accordance with a signal from said fuel quantity increase-control means, to gradually move said friction clutch in the engagement direction; and rack-return control means for operating said rack actuator, to gradually move said control rack to a position corresponding to the degree of depression of an accelerator pedal as detected by said drive state-detection means when said rack-return control means detects that a difference in the rotational speed of said output shaft and said input shaft as obtained from said drive state-detection means has decreased below a predetermined value due to the repeated operation of said fuel quantity increase-control means and said clutch control means.

2. An automatic transmission apparatus for a vehicle according to claim 1, characterized in that said fuel quantity decrease-control means and said rack-return control means control said rack actuator stepwise.

3. An automatic transmission apparatus for a vehicle according to claim 1, characterized by comprising control means having stop means for stopping the operation of an exhaust brake of said engine, upon operation of said clutch disengagement means, and cancel means for canceling the operation of said stop means upon operation of said rack-return control means.

4. An automatic transmission apparatus for a vehicle according to claim 1, characterized by comprising: neutral position control means for operating said gear position change-over means in accordance with disengagement of said friction clutch, so that said transmission is set at a neutral position when the gear position detected by said gear change-judging means is below a predetermined position; said clutch control means engaging said friction clutch in accordance with a signal from said neutral position control means; said fuel quantity increase-control means moving said rack actuator in a fuel increase direction upon operation of said clutch control means; and gear change control means for, when it is detected that the rotational speed of said friction clutch has reached a predetermined value, operating said clutch actuator to disengage said friction clutch, and operating said gear position changeover means to obtain the gear position determined by said gear change-judging means.

5. An automatic transmission for a vehicle according to claim 1, wherein when said gear change-judging means judges that a gear change operation down to a low speed is to be performed, said fuel quantity decrease-control means gradually moves said control rack to said idling speed position, said clutch disengagement means operating after said movement of said control rack so that the engine speed after disengagement of said friction clutch coincides with the engine speed before said judging of said gear change-judging means.

6. An automatic transmission apparatus for a vehicle according to claim 1, further comprising an engine controller for controlling said rack actuator, said drive state-detection means generating a signal corresponding to the degree of depression of said accelerator pedal in response to a voltage supplied from said engine controller.

* * * * *

UNITED STATES PATENT AND TRADEMARK OFFICE
CERTIFICATE OF CORRECTION

PATENT NO. : 4,785,917
DATED : November 22, 1988
INVENTOR(S) : Toshiaki Tateno et al It is certified that error appears in the above—identified patent and that said Letters Patent is hereby corrected as shown below:

Title Page, third inventor's name should read

-- Tomoyuki Iwamoto --

Signed and Sealed this

Ninth Day of May, 1989

*Attest:*

DONALD J. QUIGG

*Attesting Officer*  *Commissioner of Patents and Trademarks*